US012695493B2

(12) United States Patent
Elshafie et al.

(10) Patent No.: US 12,695,493 B2
(45) Date of Patent: Jul. 28, 2026

(54) TECHNIQUES FOR PERFORMING BEAMFORMING BASED ON ZONES

(71) Applicant: QUALCOMM Incorporated, San Diego, CA (US)

(72) Inventors: Ahmed Elshafie, San Diego, CA (US); Hung Dinh Ly, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 18/693,048

(22) PCT Filed: Nov. 15, 2021

(86) PCT No.: PCT/CN2021/130521
§ 371 (c)(1),
(2) Date: Mar. 18, 2024

(87) PCT Pub. No.: WO2023/082226
PCT Pub. Date: May 19, 2023

(65) Prior Publication Data
US 2025/0007590 A1     Jan. 2, 2025

(51) Int. Cl.
*H04L 1/02*       (2006.01)
*H04B 7/06*       (2006.01)
*H04B 7/08*       (2006.01)

(52) U.S. Cl.
CPC ....... *H04B 7/06952* (2023.05); *H04B 7/0834* (2013.01); *H04B 7/088* (2013.01)

(58) Field of Classification Search
CPC ..... H04W 4/40; H04W 76/14; H04W 72/042; H04W 36/30; H04L 5/0048; H04L 5/0091; H04L 1/18; H04B 7/088; H04B 7/04013

(Continued)

(56) References Cited

U.S. PATENT DOCUMENTS 5,890,067 A      3/1999   Chang et al.
11,304,201 B2   4/2022   Pezeshki et al.
(Continued)

FOREIGN PATENT DOCUMENTS

CN          113615103 A      11/2021
WO     WO-2019002867 A1     1/2019
WO     WO-2020205668       10/2020

OTHER PUBLICATIONS

Huawei, et al., "Definition of Coverage Zones for D2D Communication", 3GPP TSG RAN WG1 Meeting #76bis, R1-141141, Shenzhen, China, Mar. 31-Apr. 4, 2014, the whole document, 3 Pages.

(Continued)

*Primary Examiner* — Khai Tran
(74) *Attorney, Agent, or Firm* — Holland & Hart LLP /Qualcomm

(57) ABSTRACT

Methods, systems, and devices for wireless communications are described. A first wireless device, such as a reconfigurable intelligent surface (RIS), or some other relaying device, may receive a first indication of a set of zones (e.g., locations) to which the first wireless device is configured to relay one or more messages. The first device may receive a second indication of a set of beams of the first wireless device associated with a corresponding zone of the set of zones. The set of beams may be configured to serve the corresponding zone. The first wireless device may relay communications to the corresponding zone using at least one beam of the set of beams based on the communications being for the corresponding zone or for a second wireless device located in the corresponding zone.

26 Claims, 12 Drawing Sheets

(58) Field of Classification Search
USPC ........................................ 375/267, 260, 299
See application file for complete search history.

(56)                          References Cited

U.S. PATENT DOCUMENTS

| | | | |
|---|---|---|---|
| 2019/0327618 A1 | 10/2019 | Li et al. | |
| 2020/0068485 A1 | 2/2020 | Zhou et al. | |
| 2020/0403689 A1 | 12/2020 | Rofougaran et al. | |
| 2021/0352599 A1* | 11/2021 | Kusashima | H04W 56/002 |
| 2022/0095200 A1* | 3/2022 | Hosseini | H04B 17/318 |
| 2022/0173860 A1* | 6/2022 | Jiang | H04W 76/14 |
| 2022/0417897 A1* | 12/2022 | Wang | H04W 64/006 |
| 2023/0064231 A1* | 3/2023 | Haghighat | H04W 72/51 |
| 2024/0413886 A1* | 12/2024 | Yoshioka | H04W 16/28 |

OTHER PUBLICATIONS

International Search Report and Written Opinion—PCT/CN2021/130521—ISA/EPO—Jun. 23, 2022 (2107493WO1).
Supplementary European Search Report—EP21963674—Search Authority—Munich—Jul. 1, 2025 (2107493EP).

\* cited by examiner

405

First
Wireless
Device

410

Second
Wireless
Device

Indication of a set of zones

415

Indication of a set of beams associated with each
zone

420

425

Relaying
communications to
a zone

400

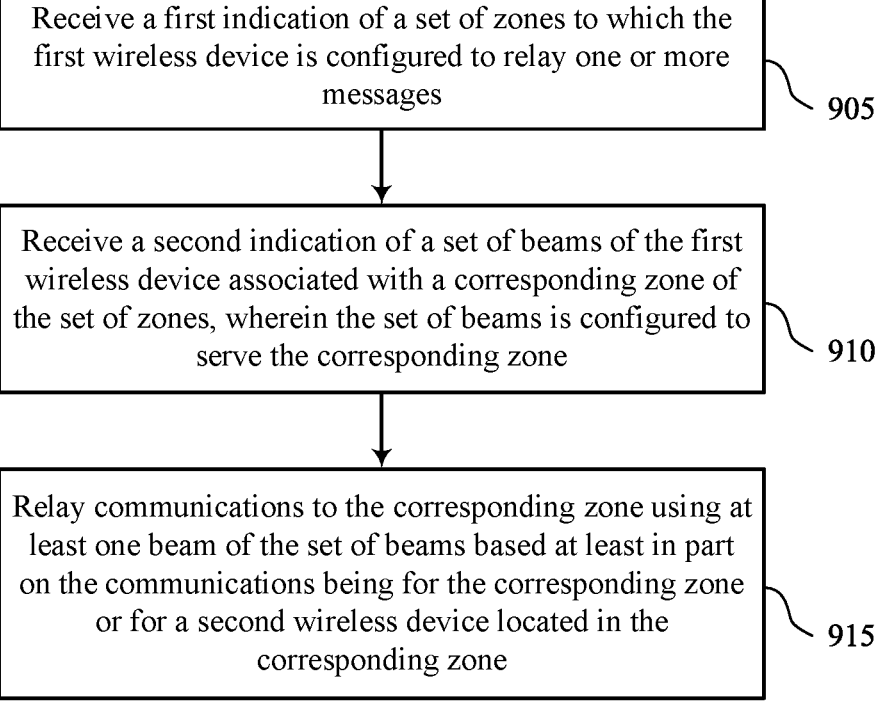

Receive a first indication of a set of zones to which the first wireless device is configured to relay one or more messages
905

Receive a second indication of a set of beams of the first wireless device associated with a corresponding zone of the set of zones, wherein the set of beams is configured to serve the corresponding zone
910

Relay communications to the corresponding zone using at least one beam of the set of beams based at least in part on the communications being for the corresponding zone or for a second wireless device located in the corresponding zone
915

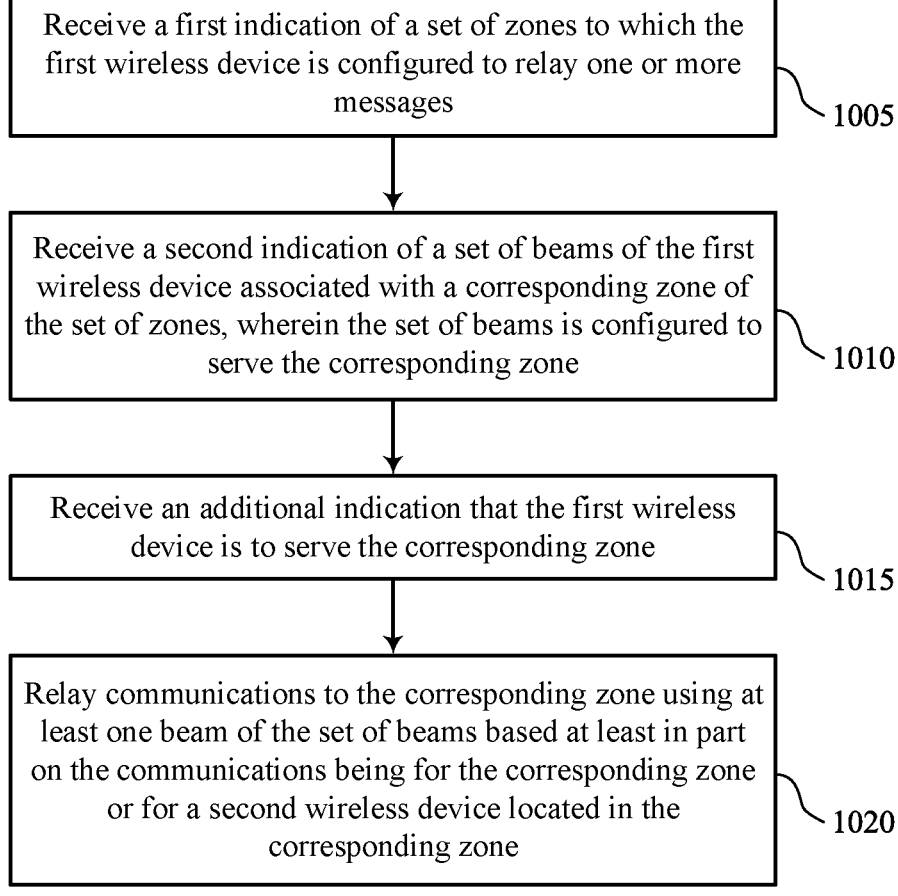

Receive a first indication of a set of zones to which the first wireless device is configured to relay one or more messages ⟍ 1005

Receive a second indication of a set of beams of the first wireless device associated with a corresponding zone of the set of zones, wherein the set of beams is configured to serve the corresponding zone ⟍ 1010

Receive an additional indication that the first wireless device is to serve the corresponding zone ⟍ 1015

Relay communications to the corresponding zone using at least one beam of the set of beams based at least in part on the communications being for the corresponding zone or for a second wireless device located in the corresponding zone ⟍ 1020

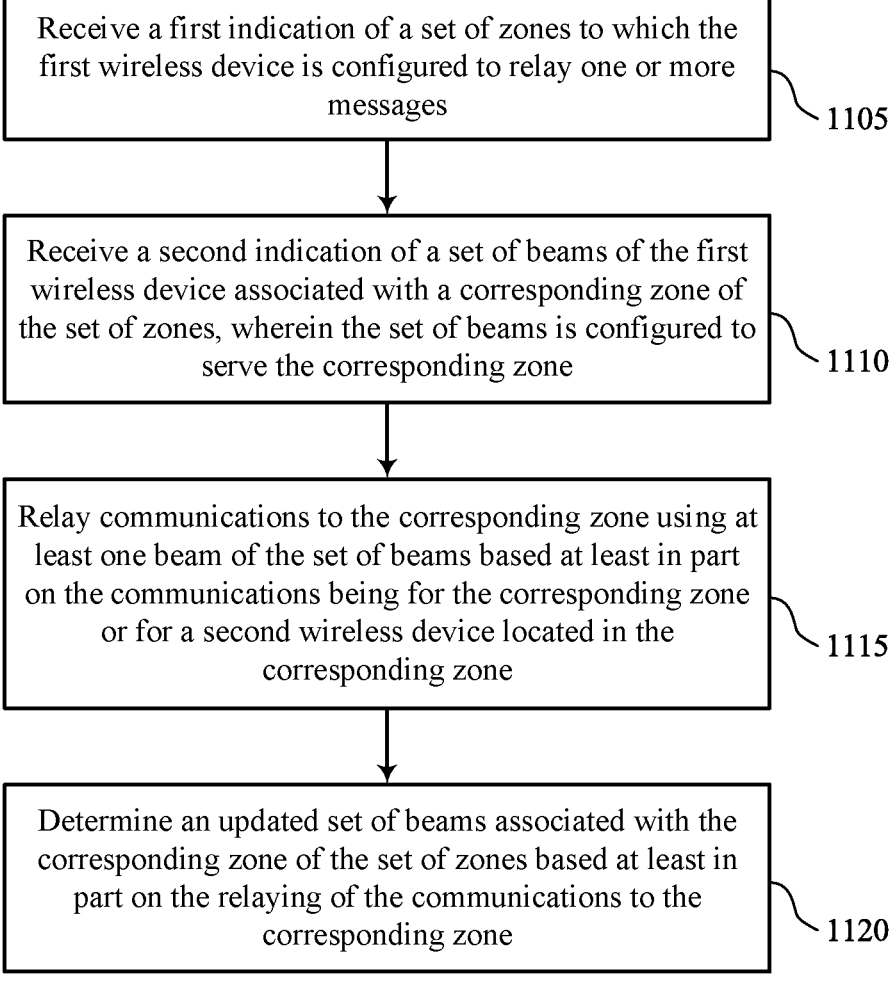

Receive a first indication of a set of zones to which the first wireless device is configured to relay one or more messages 〰 1105

Receive a second indication of a set of beams of the first wireless device associated with a corresponding zone of the set of zones, wherein the set of beams is configured to serve the corresponding zone 〰 1110

Relay communications to the corresponding zone using at least one beam of the set of beams based at least in part on the communications being for the corresponding zone or for a second wireless device located in the corresponding zone 〰 1115

Determine an updated set of beams associated with the corresponding zone of the set of zones based at least in part on the relaying of the communications to the corresponding zone 〰 1120

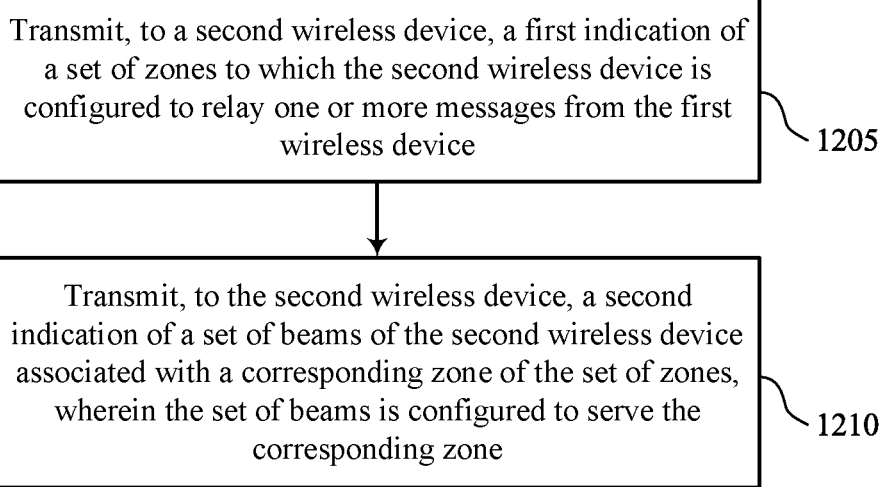

Transmit, to a second wireless device, a first indication of a set of zones to which the second wireless device is configured to relay one or more messages from the first wireless device ⟍ 1205

Transmit, to the second wireless device, a second indication of a set of beams of the second wireless device associated with a corresponding zone of the set of zones, wherein the set of beams is configured to serve the corresponding zone ⟍ 1210

TECHNIQUES FOR PERFORMING BEAMFORMING BASED ON ZONES

CROSS REFERENCE

The present application is a 371 national stage filing of International PCT Application No. PCT/CN2021/130521 by ELSHAFIE et al. entitled "TECHNIQUES FOR PERFORMING BEAMFORMING BASED ON ZONES," filed Nov. 15, 2021, which is assigned to the assignee hereof, and which is expressly incorporated by reference in its entirety herein.

FIELD OF TECHNOLOGY

The following relates to wireless communications, including techniques for performing beamforming based on zones.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support beamforming techniques for communications between wireless devices. In some examples, wireless communications systems may include a relaying device, such as a reconfigurable intelligent surface (RIS), a repeater, or a UE to facilitate transmissions between wireless devices. A relaying device may include a quantity of reflective, electrically-controllable elements. The relaying device may reflect transmissions in a specific direction based on a current configuration of the relaying device elements. For example, a relaying device may receive a beamformed communication at an angle of incidence and may reflect the beamformed communication at one or more angles different from the angle of incidence. In some cases, methods for using such a relaying device to support communications between multiple devices may be improved.

SUMMARY

The described techniques relate to improved methods, systems, devices, and apparatuses that support techniques for performing beamforming based on zones. Generally, the described techniques provide for improved methods of configuring a relaying device to relay communications between multiple other devices. In accordance with the techniques described herein, a relaying device may receive an indication of a set of beam groupings, where each beam grouping may include one or more beams. The relaying device may be configured to use a beam grouping to relay communications to a particular device or set of devices. For example, a first wireless device (e.g., a reconfigurable intelligent surface (RIS), a repeater, a low-power user equipment (UE)) may receive (e.g., from a base station, or a UE) a first indication of a set of zones to which the first wireless device is configured to relay one or more messages. The first wireless device may receive (e.g., from a base station, or a UE) a second indication of a set of beams of the first wireless device associated with a corresponding zone of the set of zones. The set of beams may be configured to serve the corresponding zone. The first wireless device may relay communications to the corresponding zone using at least one beam of the set of beams based on the communications being for the corresponding zone or for a second wireless device (e.g., a UE, or some other network device) located in the corresponding zone.

A method for wireless communications at a first wireless device is described. The method may include receiving a first indication of a set of zones to which the first wireless device is configured to relay one or more messages, receiving a second indication of a set of beams of the first wireless device associated with a corresponding zone of the set of zones, where the set of beams is configured to serve the corresponding zone, and relaying communications to the corresponding zone using at least one beam of the set of beams based on the communications being for the corresponding zone or for a second wireless device located in the corresponding zone.

An apparatus for wireless communications is described. The apparatus may include a processor, memory coupled with the processor, and instructions stored in the memory. The instructions may be executable by the processor to cause the apparatus to receive a first indication of a set of zones to which a first wireless device is configured to relay one or more messages, receive a second indication of a set of beams of the first wireless device associated with a corresponding zone of the set of zones, where the set of beams is configured to serve the corresponding zone, and relay communications to the corresponding zone using at least one beam of the set of beams based on the communications being for the corresponding zone or for a second wireless device located in the corresponding zone.

Another apparatus for wireless communications is described. The apparatus may include means for receiving a first indication of a set of zones to which a first wireless device is configured to relay one or more messages, means for receiving a second indication of a set of beams of the first wireless device associated with a corresponding zone of the set of zones, where the set of beams is configured to serve the corresponding zone, and means for relaying communications to the corresponding zone using at least one beam of the set of beams based on the communications being for the corresponding zone or for a second wireless device located in the corresponding zone.

A non-transitory computer-readable medium storing code for wireless communications is described. The code may include instructions executable by a processor to receive a first indication of a set of zones to which a first wireless device is configured to relay one or more messages, receive a second indication of a set of beams of the first wireless device associated with a corresponding zone of the set of zones, where the set of beams is configured to serve the corresponding zone, and relay communications to the corresponding zone using at least one beam of the set of beams based on the communications being for the corresponding zone or for a second wireless device located in the corresponding zone.

Some examples of the method, apparatuses, and non-transitory computer-readable medium described herein may further include operations, features, means, or instructions for receiving an additional indication that the first wireless device may be to serve the corresponding zone.

In some examples of the method, apparatuses, and non-transitory computer-readable medium described herein, the communications relayed to the corresponding zone include at least one of a reference signal, an initial access signal, or a synchronization signal block.

Some examples of the method, apparatuses, and non-transitory computer-readable medium described herein may further include operations, features, means, or instructions for identifying that the second wireless device may be in the corresponding zone and selecting one of the set of beams for the relaying of the communications to the second wireless device based on the second wireless device being in the corresponding zone.

In some examples of the method, apparatuses, and non-transitory computer-readable medium described herein, identifying that the second wireless device may be in the corresponding zone may include operations, features, means, or instructions for receiving a zone identifier of the second wireless device, where the zone identifier may be associated with the corresponding zone.

In some examples of the method, apparatuses, and non-transitory computer-readable medium described herein, receiving the zone identifier may include operations, features, means, or instructions for receiving the zone identifier in downlink control information that may be associated with either triggering or configuring training reference signal occasions to one or more UEs in the corresponding zone.

In some examples of the method, apparatuses, and non-transitory computer-readable medium described herein, receiving the zone identifier may include operations, features, means, or instructions for receiving the zone identifier in downlink control information that may be associated with the second wireless device.

Some examples of the method, apparatuses, and non-transitory computer-readable medium described herein may further include operations, features, means, or instructions for receiving an additional indication of respective zones in which one or more reference signals may be used for beam training, at least one reference signal of the one or more reference signals associated with the corresponding zone and selecting the at least one beam for use in beam training based on the at least one reference signal being associated with the corresponding zone.

In some examples of the method, apparatuses, and non-transitory computer-readable medium described herein, relaying the communications may include operations, features, means, or instructions for identifying one or more spatially correlated beams associated with the at least one beam of the set of beams and relaying the communications to the second wireless device using the one or more spatially correlated beams and the at least one beam of the set of beams.

Some examples of the method, apparatuses, and non-transitory computer-readable medium described herein may further include operations, features, means, or instructions for determining an updated set of beams associated with the corresponding zone of the set of zones based on the relaying of the communications to the corresponding zone.

4

Some examples of the method, apparatuses, and non-transitory computer-readable medium described herein may further include operations, features, means, or instructions for transmitting an additional indication of the updated set of beams to a third wireless device from which the second indication was received.

Some examples of the method, apparatuses, and non-transitory computer-readable medium described herein may further include operations, features, means, or instructions for determining an updated set of beams associated with the second wireless device based on the relaying of the communications to the second wireless device in the corresponding zone.

Some examples of the method, apparatuses, and non-transitory computer-readable medium described herein may further include operations, features, means, or instructions for transmitting an additional indication to a third wireless device from which the second indication was received, where the additional indication associates the updated set of beams with the second wireless device in the corresponding zone.

Some examples of the method, apparatuses, and non-transitory computer-readable medium described herein may further include operations, features, means, or instructions for receiving, from a base station via a Uu link, a message that includes the first indication, the second indication, or both, the message being either a Uu radio resource control message, a Uu medium access control (MAC) control element message, or a Uu downlink control information message.

Some examples of the method, apparatuses, and non-transitory computer-readable medium described herein may further include operations, features, means, or instructions for receiving, from a UE via a sidelink, a message that includes the first indication, the second indication, or both, the message being either a sidelink radio resource control message, a sidelink medium access control (MAC) control element message, a sidelink control information message, or a sidelink shared channel message.

In some examples of the method, apparatuses, and non-transitory computer-readable medium described herein, the first wireless device may be a reconfigurable reflective surface, a low-power UE, or a repeater device.

In some examples of the method, apparatuses, and non-transitory computer-readable medium described herein, each zone of the set of zones may be associated with a corresponding geographic location.

A method for wireless communications at a first wireless device is described. The method may include transmitting, to a second wireless device, a first indication of a set of zones to which the second wireless device is configured to relay one or more messages from the first wireless device and transmitting, to the second wireless device, a second indication of a set of beams of the second wireless device associated with a corresponding zone of the set of zones, where the set of beams is configured to serve the corresponding zone.

An apparatus for wireless communications is described. The apparatus may include a processor, memory coupled with the processor, and instructions stored in the memory. The instructions may be executable by the processor to cause the apparatus to transmit, to a second wireless device, a first indication of a set of zones to which the second wireless device is configured to relay one or more messages from a first wireless device and transmit, to the second wireless device, a second indication of a set of beams of the second wireless device associated with a corresponding zone of the set of zones, where the set of beams is configured to serve the corresponding zone.

Another apparatus for wireless communications is described. The apparatus may include means for transmitting, to a second wireless device, a first indication of a set of zones to which the second wireless device is configured to relay one or more messages from a first wireless device and means for transmitting, to the second wireless device, a second indication of a set of beams of the second wireless device associated with a corresponding zone of the set of zones, where the set of beams is configured to serve the corresponding zone.

A non-transitory computer-readable medium storing code for wireless communications is described. The code may include instructions executable by a processor to transmit, to a second wireless device, a first indication of a set of zones to which the second wireless device is configured to relay one or more messages from a first wireless device and transmit, to the second wireless device, a second indication of a set of beams of the second wireless device associated with a corresponding zone of the set of zones, where the set of beams is configured to serve the corresponding zone.

Some examples of the method, apparatuses, and non-transitory computer-readable medium described herein may further include operations, features, means, or instructions for transmitting an additional indication that the second wireless device may be to serve the corresponding zone.

Some examples of the method, apparatuses, and non-transitory computer-readable medium described herein may further include operations, features, means, or instructions for transmitting, for relay by the second wireless device to the corresponding zone, at least one of a reference signal, an initial access signal, or a synchronization signal block.

Some examples of the method, apparatuses, and non-transitory computer-readable medium described herein may further include operations, features, means, or instructions for transmitting a zone identifier of a third wireless device to which the second wireless device may be to relay communications from the first wireless device, where the zone identifier may be associated with the corresponding zone.

In some examples of the method, apparatuses, and non-transitory computer-readable medium described herein, transmitting the zone identifier may include operations, features, means, or instructions for transmitting the zone identifier in downlink control information that may be associated with either triggering or configuring training reference signal occasions to one or more UEs in the corresponding zone.

In some examples of the method, apparatuses, and non-transitory computer-readable medium described herein, transmitting the zone identifier may include operations, features, means, or instructions for transmitting the zone identifier in downlink control information that may be associated with the third wireless device.

Some examples of the method, apparatuses, and non-transitory computer-readable medium described herein may further include operations, features, means, or instructions for transmitting an additional indication of respective zones in which one or more reference signals may be used for beam training, at least one reference signal of the one or more reference signals associated with the corresponding zone.

Some examples of the method, apparatuses, and non-transitory computer-readable medium described herein may further include operations, features, means, or instructions for receiving an additional indication of an updated set of beams from the second wireless device, where the updated set of beams may be associated with the corresponding zone of the set of zones based on relaying by the second wireless device of communications from the first wireless device to the corresponding zone.

Some examples of the method, apparatuses, and non-transitory computer-readable medium described herein may further include operations, features, means, or instructions for receiving an additional indication of an updated set of beams from the second wireless device, where the additional indication associates the updated set of beams with a third wireless device in the corresponding zone, where the updated set of beams may be associated with the third wireless device based on relaying by the second wireless device of communications from the first wireless device to the third wireless device in the corresponding zone.

Some examples of the method, apparatuses, and non-transitory computer-readable medium described herein may further include operations, features, means, or instructions for transmitting, via a Uu link, a message that includes the first indication, the second indication, or both, the message being either a Uu radio resource control message, a Uu medium access control (MAC) control element message, or a Uu downlink control information message, where the first wireless device may be a base station.

Some examples of the method, apparatuses, and non-transitory computer-readable medium described herein may further include operations, features, means, or instructions for transmitting, via a sidelink, a message that includes the first indication, the second indication, or both, the message being either a sidelink radio resource control message, a sidelink medium access control (MAC) control element message, a sidelink control information message, or a sidelink shared channel message, where the first wireless device may be a UE.

BRIEF DESCRIPTION OF THE DRAWINGS

FIGS. 9 through 12 show flowcharts illustrating methods that support techniques for performing beamforming based on zones in accordance with aspects of the present disclosure.

DETAILED DESCRIPTION

Figure 1:
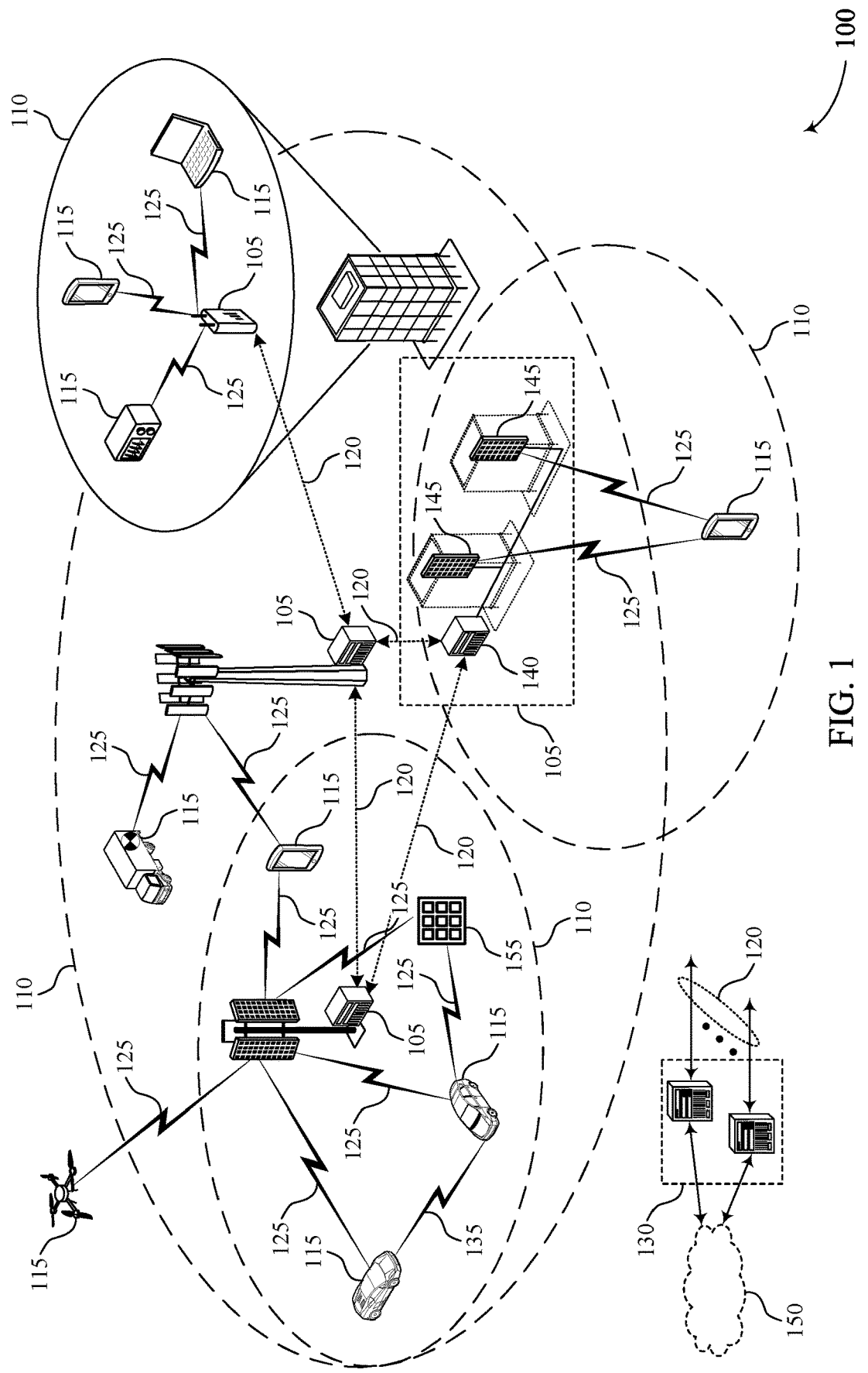
FIG. 1 illustrates an example of a wireless communications system that supports techniques for performing beamforming based on zones in accordance with aspects of the present disclosure.

In some wireless communications systems (e.g., systems implementing a massive multiple input-multiple output (MIMO) communication scheme), wireless devices may implement spatial division multiple access (SDMA) to increase signaling throughput. For example, a base station may use beamforming techniques to communicate with multiple user equipments (UEs) concurrently by using spatial dimensions provided by an environment. However, in some cases, physical proximity or environmental factors (e.g., interference, blockage) may impair beamforming communications between the base station and the multiple UEs. In some cases, wireless devices may be unable to successfully transmit information via a line-of-sight (LOS) path. For example, an LOS path (e.g., a straight line) between a base station and a UE may be obstructed. To overcome such impairments, the base station may employ an active antenna unit (AAU) to act as a relay between the base station and the multiple UEs. The AAU may include one or more antenna ports, radio frequency (RF) chains, and power amplifiers. The AAU may allow the base station to increase spatial diversity, beamforming gain, and cell coverage. For example, the AAU may receive a beamformed communication from the base station, amplify the beamformed communication, and re-transmit the beamformed communication to a UE. As such, in comparison to receiving the beamformed communication directly from the base station, the UE may have a higher likelihood of successfully receiving the beamformed communication via the AAU. However, active components (e.g., RF chains, power amplifiers) used by the AAU to amplify signals may be associated with increased power consumption. For example, a power amplifier at the AAU may utilize significant power overhead to amplify and re-transmit a received signal. Such power overhead may be undesirable and inefficient in some systems.

In some examples, the base station (e.g., or some other transmitting device such as a controlling UE) may employ a relaying device that uses passive components (e.g., capacitors, resistors) to reflect incoming signals in one or more directions with a reduced power overhead. In some cases, a relaying device may be a reconfigurable intelligent surface (RIS), a repeater, a low-power UE, etc. For example, a RIS may use a capacitor and a resistor to reflect a signal in a specific direction (e.g., instead of using a power amplifier to amplify and re-transmit the signal). As such, the RIS may increase cell coverage, spatial diversity, and beamforming gain while consuming less power than an AAU. In some aspects, the base station may dynamically configure the RIS to reflect an incoming signal in a specific direction. For example, the base station may configure the RIS to reflect a beamformed communication in a direction of a UE based on a location of the UE. Similarly, the UE may transmit a beamformed communication in a direction of the RIS based on a base station configuration or a UE selection. To effectively implement the RIS, the base station may indicate configuration information for the RIS to the UE.

For example, a base station may configure a RIS to relay reference signals over a set of beams (of the relaying device) to determine a preferred beam to communicate with a receiving device, such as a UE. For example, a base station may transmit a reference signal to a RIS, and the relaying RIS may relay the reference signal over multiple beams. In some cases, the RIS may use a different beamformer (e.g., codebook, or non-codebook) for each reference signal occasion. A UE may receive the reference signal via one or more beams and indicate a preferred beam of the UE to the base station (via the RIS). The base station may then configure the relaying device to transmit future signals to the UE via the preferred beam (in accordance with z particular precoding). Techniques for identifying a preferred beam of a receiving device may be improved.

In accordance with techniques described herein to improve communications using a relaying device, a relaying device may receive an indication of a set of zones (e.g., groupings, locations) the relaying device is to serve and a set of beams associated with each zone. For example, a base station may identify a location of a relaying device, and based on the location, the base station may determine a set of zones the relaying device is to service. Further, the base station may identify one or more beams (e.g., one or more beams of a particular phase and amplitude) that may reach each of the zones. The base station (e.g., or some other transmitting device such as a UE) may then transmit a signal (e.g., a synchronization signal block (SSB), initial access signal, reference signal) to the relaying device that the relaying device is meant to relay to a particular zone or UE within a zone. The relaying device may direct the signal to the particular zone or UE using at least one of the one or more beams. In some cases, the relaying device may perform beam refinement based on the indicated zone and/or set of beams associated with that zone to identify an updated preferred beam of a particular zone or UE.

Particular aspects of the subject matter described herein may be implemented to realize one or more advantages. The described techniques may support improvements in relaying communications using a relaying device by improving coordination between a transmitting device and a relaying device, and by improving reliability, among other advantages. As such, supported techniques may include improved network operations and, in some examples, may promote network efficiencies, among other benefits.

Aspects of the disclosure are initially described in the context of wireless communications systems. Aspects are the described with reference to a process flow. Aspects of the disclosure are further illustrated by and described with reference to apparatus diagrams, system diagrams, and flowcharts that relate to techniques for performing beamforming based on zones.

FIG. 1 illustrates an example of a wireless communications system 100 that supports techniques for performing beamforming based on zones in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE- SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Various aspects of the present disclosure relate to improved techniques for configuring communications via a relaying device 155, such as a RIS, a repeater, or UE 115. For example, the wireless communications system 100 may include one or more relaying devices 155. A relaying device 155 may reflect a beamformed transmission for improved spatial diversity. For example, if there is an obstruction between a base station 105 and a UE 115, beamformed communications between the base station 105 and the UE 115 may be blocked (or otherwise result in relatively poor signal quality) due to the obstruction. A relaying device 155 may support communications between the base station 105 and the UE 115 by reflecting beamformed communications so as to avoid the obstruction. Relaying devices 155 may provide additional spatial diversity for communications while operating according to relatively low power overheads (e.g., below a threshold power level).

In some cases, a first wireless device (e.g., a relaying device 155, such as a reconfigurable intelligent surface (RIS), a repeater, or a UE) may receive a first indication (e.g., from a base station 105, or UE 115) of a set of zones to which the first wireless device is configured to relay one or more messages. The first wireless device may receive (e.g., from a base station 105, or a UE 115) a second indication of a set of beams of the first wireless device associated with a corresponding zone of the set of zones. The set of beams may be configured to serve the corresponding zone. The first wireless device may relay communications to the corresponding zone using at least one beam of the set of beams based on the communications being for the corresponding zone or for a second wireless device (e.g., a base station 105, or UE 115) located in the corresponding zone.

Figure 2:
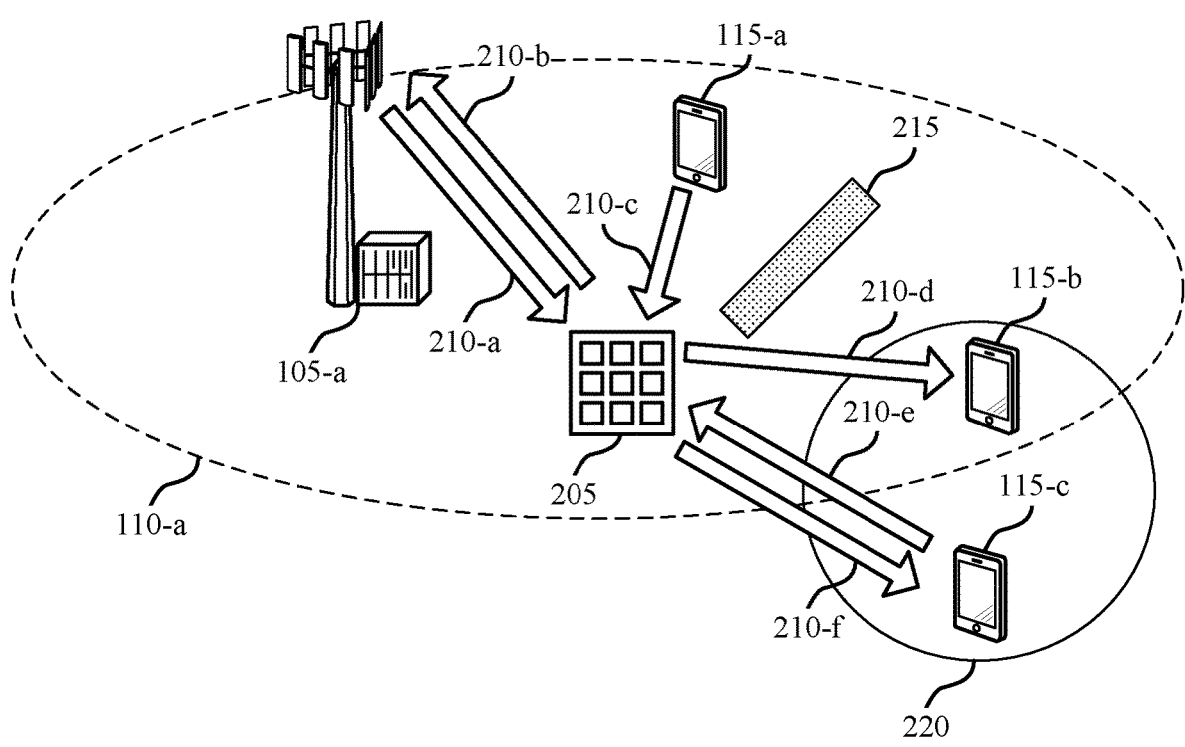
FIGS. 2 and 3 illustrate examples of wireless communications systems that support techniques for performing beamforming based on zones in accordance with aspects of the present disclosure.

FIG. 2 illustrates an example of a wireless communications system 200 that supports techniques for performing beamforming based on zones in accordance with aspects of the present disclosure. The wireless communications system 200 may include base station 105-a, UEs 115-a, 115-b, and 115-c, and a RIS 205, which may be examples of a base station 105, UEs 115, and a RIS as described with reference to FIG. 1. A RIS 205 as described herein may, in some cases, represent a repeater, or a low-power UE 115. Base station 105-a may serve geographic coverage area 110-a. In some cases, base station 105-a may perform a configuration procedure for configuring a RIS 205 with a set of beams to use for relaying communications to one or more other devices. Additionally or alternatively, other wireless devices, such as UE 115-a, may implement a same or similar configuration procedure as described with reference to FIG. 2.

Base station 105-a may serve multiple UEs 115 and in some examples, base station 105-a may transmit information to one or more UEs 115 using beamformed communications (e.g., messages sent using beams). In some examples, physical proximity, environmental factors (e.g., interference from other devices, blockages due to obstructions), or power constraints may impair beamformed communications between base station 105-a and a UE 115. In some examples, base station 105-a may be unable to successfully transmit information to a UE 115 via an LOS path. For example, base station 105-a may be unable to transmit information directly to UEs 115-b and 115-c via an LOS path, for example, due to interference from one or more other devices, due to a power constraint at base station 105-a, due to an obstruction 215, such as a building, due to a physical distance between base station 105-a and the UEs 115 (e.g., specifically UE 115-c, as UE 115-c may be outside geographic coverage area 110-a, or due to any other factors affecting signal quality between base station 105-a and the UEs 115. In some such examples, base station 105-a may transmit information to UEs 115-b and 115-c by reflecting a transmission off of a reflective or semi-reflective device (e.g., surface), or a relaying device which may allow the transmission to reduce interference, avoid an obstruction, or otherwise improve the signal quality of the transmission between base station 105-a and UEs 115-b and 115-c. In some cases, a relaying device may be a RIS 205, a repeater (e.g., a repeater with a fixed location), or a UE 115, such as a low-power UE 115 configured to relay communications between a transmitting device and an intended receiving device.

In some examples, the wireless communications system 200 may include one or more RISs 205 to facilitate transmissions between wireless devices. RISs 205 may be deployed in cellular systems including LTE, 5G NR, and other cellular systems. For example, a RIS 205 may facilitate the transmission of beamformed Uu communications such as between base station 105-a and UEs 115-b and 115-c. Accordingly, base station 105-a may transmit a signal via communications link 210-a (e.g., a downlink communications link) to RIS 205 and RIS 205 may be configured to relay the signal to UE 115-b, UE 115-c, or both (via communication links 210-d, and 210-f, respectively).

In another example, a RIS 205 may facilitate the transmission of beamformed sidelink (e.g., PC5) communications such as between UE 115-a (e.g., a controlling UE 115, a serving UE 115) and UEs 115-b and 115-c. Sidelink communications (e.g., device-to-device (D2D) communications, V2X) allows two UEs 115 to communicate with each other directly without routing from a base station 105. The sidelink communication may share the same spectrum (e.g., licensed spectrum) as other communications in the cellular link (e.g., uplink). A base station 105 may control the resource allocation over sidelink to coordinate the interferences among different pairs of sidelink communicating UEs 115 (e.g., mode 1 resource allocation). Alternatively, a UE 115 may determine resource allocation autonomously based on sensing and reservation (e.g., mode 2 resource allocation). In mode 2 resource reservation, a UE 115 may sense the medium, and determine free resources for communications based on the sensing. Such sensing may depend on the activities of other UEs 115 in the vicinity of the sensing UE 115 (e.g., based on measured reference signal received power (RSRP)). For example, if a UE 115 measures RSRP on a frequency resource to be larger than a threshold, then the UE 115 may determine that this resource is reserved, and will be occupied by other UEs 115 in a future transmission. Accordingly, a UE 115 may use resources that are not reserved or that are reserved by other UEs 115 that are far away from the UE 115 (such that the other UEs 115 are not creating interference). Accordingly, with reference to sidelink communications, UE 115-*a* may transmit a signal to RIS 205 (via communication link 210-*c*) to be relayed to UE 115-*b*, UE 115-*c*, or both, where UE 115-*a* may be a controlling UE 115 (e.g., a serving UE 115) of the RIS 205, the UEs 115, or a combination thereof. Accordingly, the RIS 205 may relay the signal to UE 115-*b* (via communications link 210-*d*), to UE 115-*c*, or both.

In some cases, a RIS 205 may be self-contained (e.g., the RIS 205 may be a standalone RIS) or may be associated with (e.g., paired with) some other wireless device (e.g., a RIS-enabled UE 115). In some examples, the RIS 205 may be capable of configuring a reflected beam direction and a reflected beam width, among other capabilities. The reflected beam direction, reflected beam width, or both may be based on the incoming beam direction (e.g., the direction of communication links 210-*a* and 210-*c*), the incoming beam width (e.g., the width of beams associated with communication links 210-*a* and 210-*c*), or both.

In some examples, a RIS 205 may be capable of reflecting one beam at a time or may be capable of reflecting multiple beams concurrently. Base station 105-*a* may transmit signals to RIS 205 using a single beam, and RIS 205-*a* may reflect the signals at varying angles at different time instances (e.g., RIS 205-*a* may perform a beam sweep, as described in more detail with reference to FIG. 3).

A RIS 205 may include controller and a surface and when a RIS 205 is deployed to aid in network communications (e.g., Uu communications, sidelink communications), the RIS controller may be used to control the propagation environment using the RIS surface. The RIS's 205 reflection matrix may be dynamically changed to adjust one or more parameters of a beam (e.g., phase, width). In some cases, a base station 105 (e.g., or some other controlling device, such as UE 115-*a*) may configure the RIS controller to relay reference signals over a set of beams (of the RIS 205) to determine a preferred beam to communicate with a receiving device, such as a UE 115. For example, base station 105-*a* may transmit a reference signal to the RIS 205 (via communications link 210-*a*), and the relaying RIS 205 may relay the reference signal over multiple beams (e.g., communications link 210-*d*, and/or 210-*f*). In some cases, the RIS 205 may use a different beamformer (e.g., codebook, or non-codebook) for each reference signal occasion. A UE 115 may receive the reference signal via one or more beams and indicate a preferred beam of the UE 115 to the base station 105 (via the RIS 205, via communications link 210-*e* and 210-*b*). The base station 105 may then configure the RIS 205 to transmit future signals to the UE 115 via the preferred beam (in accordance with a particular precoding). Techniques for identifying a preferred beam of a receiving device may be improved.

In accordance with techniques described herein to improve communications using a relaying device, such as a RIS 205, the RIS 205 may receive an indication of sets of beams, where each set may include one or more beams. In some cases, each set of beams may be associated with a particular UE 115, group of UEs 115, location, etc. In some cases, the RIS 205 may receive an indication of a set of zones 220 (e.g., groupings, locations) the RIS is to serve and a set of beams associated with each zone 220. For example, base station 105-*a* may identify a location of the RIS 205, and based on the location, base station 105-*a* may determine a set of zones 220 the RIS 205 is to service. Further, base station 105-*a* may identify one or more beams (e.g., one or more beams of a particular phase and amplitude) that may reach each of the zones 220. The base station (e.g., or some other transmitting device such as UE 115-*a*) may then transmit a signal (e.g., a synchronization signal block (SSB), initial access signal, reference signal) to the relaying device that the relaying device is meant to relay to a particular zone 220 or UE 115 within a zone 220. Accordingly, the RIS 205 (e.g., the controller of the RIS 205) may generate the one or more beams associated with the particular zone 220 to relay the signal. Because the RIS location is known (e.g., the RIS 205 may be located in a particular zone 220), and a UEs 115 location may be known, indicating a zone identifier to a RIS 205 (by a transmitting device, such as base station 105-*a*) may be sufficient for the RIS 205 to reflect a received signal to the zone 220 corresponding with the indicated zone 220.

Accordingly, base station 105-*a* may transmit an indication of the set of one or more zones 220 to the RIS 205, such as a set of zone IDs, for which the RIS 205 is to serve. Base station 105-*a* may include the indication of the set of zones in a radio resource control (RRC) message (e.g., a Uu RRC message), a medium access control (MAC) control element (MAC-CE) message (e.g., a Uu MAC-CE message), a downlink control information (DCI) message (e.g., a Uu DCI message), or a combination thereof. Additionally, base station 105-*a* may transmit an indication of a set of one or more beams associated with each zone, where base station 105-*a* may determine the set of one or more beams based on the location of the RIS 205 and the zone location. Base station 105-*a* may include the indication of the set of beams in an RRC message (e.g., a Uu RRC message), a MAC-CE message (e.g., a Uu MAC-CE message), a DCI message (e.g., a Uu DCI message), or a combination thereof. Base station 105-*a* may transmit the indication of the set of zones and the indication of the set of beams in the same message or in different messages.

In some implementations, a RIS 205 may receive the indication of the set of zones and/or the set of beams associated with each zone from a UE 115, such as UE 115-*a*. UE 115-*a* may be controlling UE 115 (e.g., serving UE 115, primary UE 115) of RIS 205, UE 115-*b*, UE 115-*c*, or a combination thereof. Accordingly, UE 115-*a* may include the indication of the set of zones in an RRC message (e.g., a PC5 RRC message), a MAC-CE message (e.g., a PC5 MAC-CE message), a sidelink control information (SCI) message (e.g., a PC5 SCI message, such as an SCI-1 or SCI-2), a PSSCH, or a combination thereof. Similarly, UE 115-*a* may include the indication of the set of beams in an RRC message (e.g., a PC5 RRC message), a MAC-CE message (e.g., a PC5 MAC-CE message), an SCI message (e.g., a PC5 SCI message, such as an SCI-1 or SCI-2), a physical sidelink shared channel (PSSCH), or a combination thereof. UE 115-*a* may transmit the indication of the set of zones and the indication of the set of beams in the same message or in different messages. In some cases, base station 105-*a* may indicate the set of zones, the set of beams, or a combination therefore to UE 115-*a* and may request UE 115-*a* to relay the indications to the RIS 205. In some cases, UE 115-*a* may autonomously determine the set of zones and the set of beams and determine to indicate the set of zones, the set of beams, or both to the RIS 205.

Upon being configured the set of zones, the set of beams, or both, a transmitting device (e.g., base station 105-*a*, UE 115-*a*, or both) may transmit a signal (e.g., an SSB, reference signal, initial access signal) to RIS 205 intended for a particular UE 115 (e.g., UE 115-*a*, UE 115-*b*), for a particular zone 220, or a particular group of UEs 115 with in a zone 220. The transmitting device may indicate the zone (e.g., a zone identifier) associated with the signal. As such, the RIS 205 may receive the signal, identify the zone 220 associated with the signal, and transmit the signal over the set of beams associated with the zone 220. In some cases, the relaying device may perform beam refinement (as described in more detail with reference to FIG. 3) based on the indicated zone and/or set of beams associated with that zone to identify an updated preferred beam of a particular zone or a UE 115 within the zone.

Configuring a RIS 205 (e.g., or some other relaying device) with a set of beams to use to serve a particular UE 115, a group of UEs 115, a location, etc. may aid initial access procedures as the RIS 205 may be configured with a set of beams that may serve an initial access UE 115 (because the initial access UE 115 is within a zone served by the RIS 205).

Figure 3:
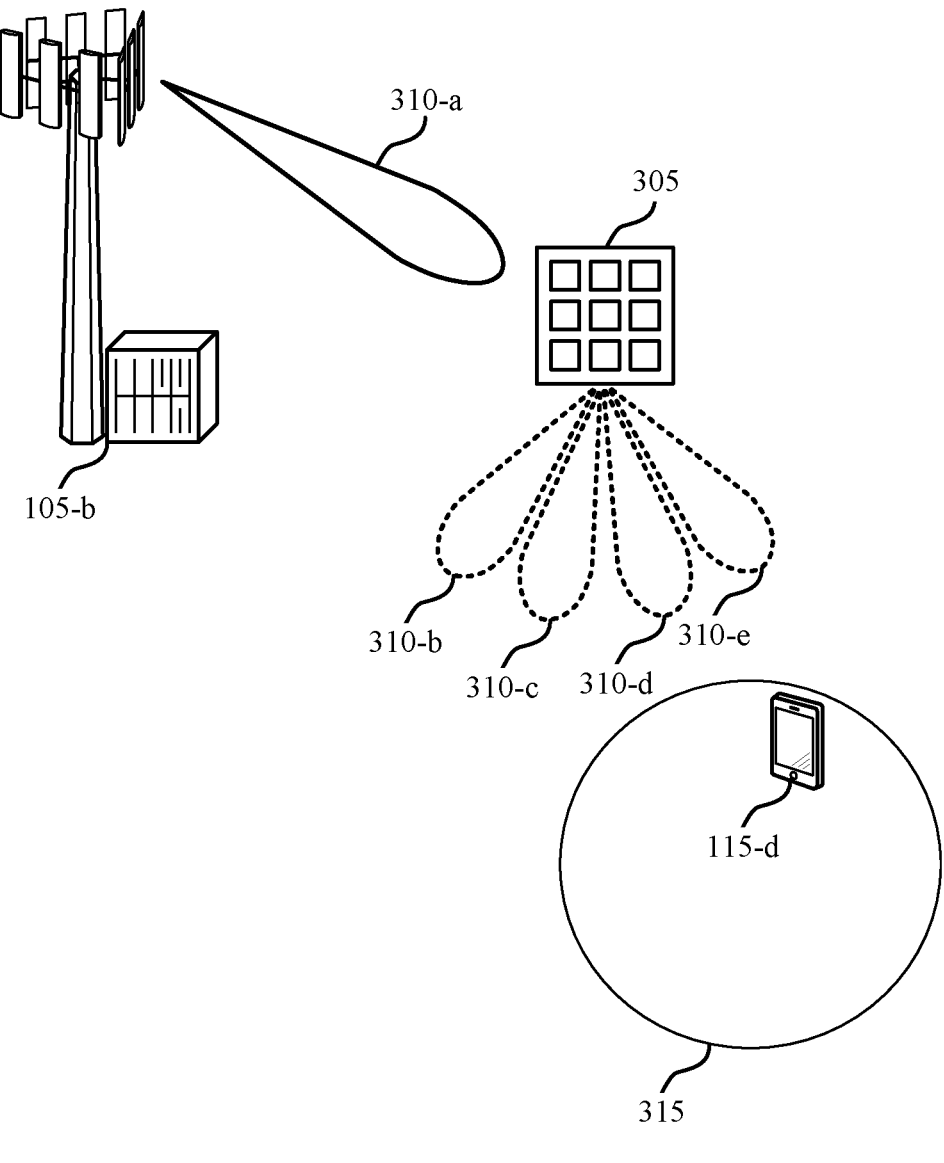

FIG. 3 illustrates an example of a wireless communications system 300 that supports techniques for performing beamforming based on zones in accordance with aspects of the present disclosure. The wireless communications system 300 may include base station 105-*b*, UE 115-*d*, and a RIS 305, which may be examples of a base station 105, a UE 115, and a RIS as described with reference to FIGS. 1 and 2. A RIS 305 as described herein may, in some cases, represent a repeater, or a low-power UE 115. In some cases, base station 105-*a* may perform a configuration procedure for configuring RIS 205 with a set of beams to use for relaying communications to one or more other devices. Additionally or alternatively, other wireless devices, such as a UE 115, may implement a same or similar configuration procedure as described with reference to FIG. 3.

As described herein, a transmitting device (e.g., a base station 105, or a UE 115) may transmit signals to a receiving device via a RIS 305. A RIS 305 may include a quantity of reflective, electrically-controllable elements. Each element may have electromagnetic characteristics that are reconfigurable and that define how beamformed communications reflect off the element. For example, a reflection coefficient of a reflective element may determine a reflection angle (e.g., based on an angle of incidence) for an incoming signal and may be reconfigurable by the RIS 305 or by the wireless network (e.g., via control signaling by a base station 105, such as base station 105-*a*, or a serving UE 115). In some examples, the reflective elements may be uniformly distributed. The RIS 205 may reflect transmissions in a specific direction (e.g., in a controlled manner) based on a combination of configured states of reflective elements. For example, the RIS 305 may receive a beamformed transmission from base station 105-*b* using beam 310-*a* at an angle of incidence and may reflect the beamformed transmission at a different angle according to a current configuration of RIS 305-*a* (or a current configuration of one or more specific elements of the RIS 305).

In some implementations, a RIS 305 may perform a beam training procedure to alter one or more channel realizations in a controlled manner, which may enhance channel diversities. For example, the RIS 205 may alter a channel realization for a channel by changing a reflection angle and—accordingly—change the channel quality, signal quality, signal direction, or a combination thereof for communications on the channel. Increased channel diversity (e.g., increased spatial diversity based on different beam 310 reflections and directions) may provide robustness to channel blocking and channel fading, which may provide advantages in the wireless communications system 300.

In some cases, a RIS 305 may perform a beam training procedure based on a set of zones the RIS 305 is configured to serve. The beam training procedure may include the RIS 305 determining whether to update the set of beams associated with a zone 315, a particular UE 115, or a particular group of UEs 115. Accordingly, a RIS 305 may be configured with a set of zones 315 to serve and a set of beams to serve each zone 315. For example, the RIS 305 may be configured to serve zone 315, and in some cases, the RIS 305 may be configured with beams 310-*b*, 310-*c*, 310-*d*, and 310-*e* to serve the zone 315. In another example, the RIS 305 may be configured with a subset of beams 310-*b*, 310-*c*, 310-*d*, and 310-*e* to serve zone 315. For example, the RIS 305 may be configured with beam 310-*d* to serve zone 315. The RIS 305 may then determine a number of spatially correlated beams associated with beam 310-*d*. In some cases, the RIS 305 may configured with the number of beams to determine. For example, the RIS 305 may be configured to determine n total beams (e.g., including the beams the RIS 305 was configured with, such as beam 310-*d*), or may be configured to determine m additional beams to the beams the RIS 305 was already configured with (e.g., beam 310-*d*). In some cases, the RIS 305 may be configured with a minimum threshold of beams 310 to determine, or a maximum threshold of beams 310 to determine, or both. The RIS 305 may be preconfigured with the number of beams 310 to determine, or may receive a signal indicating the number of beams to determine (e.g., an RRC signal, a MAC-CE signal, a DCI signal). Accordingly, the RIS 305 may determine that beams 310-*b*, 310-*c* and 310-*e* are spatially correlated with beam 310-*d*.

In some implementations, the RIS 305 may receive a signal from base station 105-*b* (e.g., a DCI signal) that indicates (e.g., configures) training reference signal occasions. In some cases, the signal may include a zone ID and/or UE IDs that the RIS is configured to serve. Base station 105-*b* may indicate the zone ID in downlink and/or uplink DCI so that RIS's controller may use a beam 310 to serve a UE 115 within the indicated zone 315 associated with the zone ID. Base station 105-*b* may configure the beam training reference signals to be associated with a particular zone ID. Accordingly, when a reference signal is triggered (e.g., when a reference signal occasion is triggered), the RIS's controller may change the beam 310 based on the triggered reference signal and the zone associated with the triggered reference signal.

Accordingly, base station 105-*b* may transmit a signal (e.g., a reference signal such as a CSI-RS) via beam 310-*a* to the RIS 305. In some cases, the signal may include an indication that the signal is intended for the zone 315 (e.g., via a zone ID), or for UE 115-*d* (e.g., via a UE ID), or both. Accordingly, upon receiving the signal, the RIS 305 may identify the set of beams 310 associated the zone 315, UE 115-*d*, or both (e.g., where the RIS 305 was configured with beams 310-*b* through 310-*e*, or the RIS 305 was configured with a subset of beams 310-*b* through 310-*e* and the RIS 305 determined one or more spatially correlated beams associated with the subset). The RIS 305 may then reflect the signal via beams 310-*b*, 310-*c*, 310-*d*, and 310-*e*. The RIS 305 may relay the signal via beams 310-*b* through 310-*e* in a beam sweeping manner, where the RIS 305 may transmit the signal via each beam 310 at a different time. In some cases, the RIS 305 may transmit the signal via each beam 310 at the same time.

UE 115-*d* may receive signals via one or more of the beams 310. In some cases, UE 115-*d* may perform measurements of the one or more signals (e.g., RSRP, reference signal received quality (RSRQ), signal-to-interference-plus-noise ratio (SINR), etc.). In some cases, UE 115-*d* may determine one or more preferred beams 310 based on the measurements. UE 115-*d* may transmit a report back to the RIS 305, or back to the base station 105-*b* via the RIS 305. In some cases, the report may include an indication of the measurements of the one or more signals (associated with the one or more beams 310), or an indication of the preferred one or more beams of UE 115-*d*, or both.

In some implementations, the RIS 305 may receive the report from UE 115-*d* and determine one or more preferred beams 310 of UE 115-*d* based on the report. In some implementations, the RIS 305 may receive multiple reports associated with different UEs 115 in the zone 315. In such cases, the RIS 305 may determine one or more preferred beams 310 of each UE 115, or one or more preferred beams 310 to serve the zone 315, or a combination thereof. For example, the RIS 305 may receive reports from multiple UEs 115, and a majority of the reports may indicate beam 310-*e* as a preferred beam 310. Accordingly, the RIS 305 (e.g., the RIS controller) may determine to update the set of beams associated with zone 315 to remove the original set of beams 310 associated with zone 315, to include beam 310-*e*, or a combination thereof. The RIS 305 (e.g., the RIS controller) may transmit a report to base station 105-*b* indicating the updated set of beams to serve the zone 315 (e.g., where the report may indicate a zone ID and one or more beam IDs), indicating one or more beams to serve a particular UE 115 or group of UEs 115 (e.g., where the report may indicate a zone ID, one or more UE IDs, and one or more beam IDs), or a combination thereof.

Base station 105-*d* may receive the report and determine to update the set of beams 310 associated with the zone 315, a UE 115, a group of UEs 115, or a combination thereof. Base station 105-*b* may confirm the updated set of beams provided by the RIS 305, or may determine a different set of beams from the RIS 305 to serve zone 315. Base station 105-*b* may transmit a message to the RIS 305 confirming the updated set of beams (e.g., acknowledging the updated set of beams), or reconfiguring the RIS 305 with an updated set of beams 310 to serve zone 315. In some cases, base station 105-*b* may configure the RIS 305 with a subset of one or more beams 310 to serve a particular UE 115, to serve a particular group of UEs 115, or both, where the subset of one or more beams 310 may be the same or different from the set of beams configured to serve the zone 315. In some cases, the RIS 305 may determine to update the set of beams 310 associated with the zone 315 without acknowledgement from base station 105-*b*.

In some other cases, the RIS 305 may relay the UE report to base station 105-*b*. Accordingly, base station 105-*b* may determine one or more preferred beams 310 of UE 115-*d*. In some implementations, base station 105-*b* may receive multiple reports associated with different UEs 115 in the zone 315 (via RIS 305). In such cases, base station 105-*d* may determine one or more preferred beams 310 of each UE 115, or one or more preferred beams 310 to serve the zone 315, or a combination thereof. Base station 105-*d* may receive the one or more UE reports and determine to update the set of beams 310 associated with the zone 315. Base station 105-*b* may transmit a message to the RIS 305 indicating the updated set of beams to serve zone 315, indicate one or more beams to serve a particular UE 115 or group of UEs 115, or a combination thereof.

In some implementations, the RIS 305, base station 105-*b*, or both may determine to update the set of beams 310 associated with a zone 315, a UE 115, or a group of UEs 115, based on a number of beam training procedures. For example, the RIS 305, base station 105-*b*, or both may refrain from updating a set of beams (for a zone 315, a UE 115, or a group of UEs 115) until a same set of beams is indicated (for the zone 315, the UE 115, or the group of UEs 115) for a number of beam training procedures. For example, if after the number of beam training procedures, UE 115-*d* indicated the same set of beams for each beam training procedure, then the RIS 305, base station 105-*b*, or both may determine to update the set of beams based on the set of beams indicated by UE 115-*d* to serve the zone 315, to serve UE 115-*d*, or both. Accordingly, the RIS 305, base station 105-*b*, or both may refrain from updating beams unless there is a long term trend of a preferred set of one or more beams 310.

In some implementations, the RIS 305, base station 105-*b*, or both may determine to update the set of beams 310 associated with a zone 315 based on a number of reports from UEs 115. For example, the RIS 305, base station 105-*b*, or both may refrain from updating the set of beams associated with a zone 315 unless a number of UEs 115 each indicate a same beam 310 (or a same set of beams) as preferred beams 310. For example, the number may be five. Accordingly, if five UEs 115 indicate that beam 310-*e* is a preferred beam then the RIS 305, base station 105-*b*, or both may update the set of beams 310 associated with zone 315 to at least include beam 310-*e*.

In some implementations, a RIS 305, base station 105-*b*, or both may determine to update a set of beams associated with a UE 115, a group of UEs 115, a zone 315, or a combination thereof based on previous communications with one or more UEs 115. For example, UE 115-*d* may consistently transmit a signal to the RIS 305, base station 105-*b* (via the RIS 305), or both using a particular uplink beam. In some cases, the RIS 305 (and/or base station 105-*b*) may determine a corresponding downlink beam 310 associated with the uplink beam and may determine whether the determined downlink beam is included in a set of beams 310 configured for the zone 315, and/or UE 115-*b*. If the determined beam is not included in the set of beams 310, the RIS (and/or base station 105-*b*) may updated the set of beams (for the zone 315, for UE 115-*b*, or both) to at least include the determined downlink beam 310.

As described with reference to FIG. 2, the RIS 305 may be configured by and/or relay signals of a UE 115 (e.g., a controlling UE, a serving UE 115). Accordingly, the techniques described with reference to FIG. 3 may not be limited to a RIS 305 and base station 105-*a* but may also be applied by a RIS 305 and UE 115.

Figure 4:
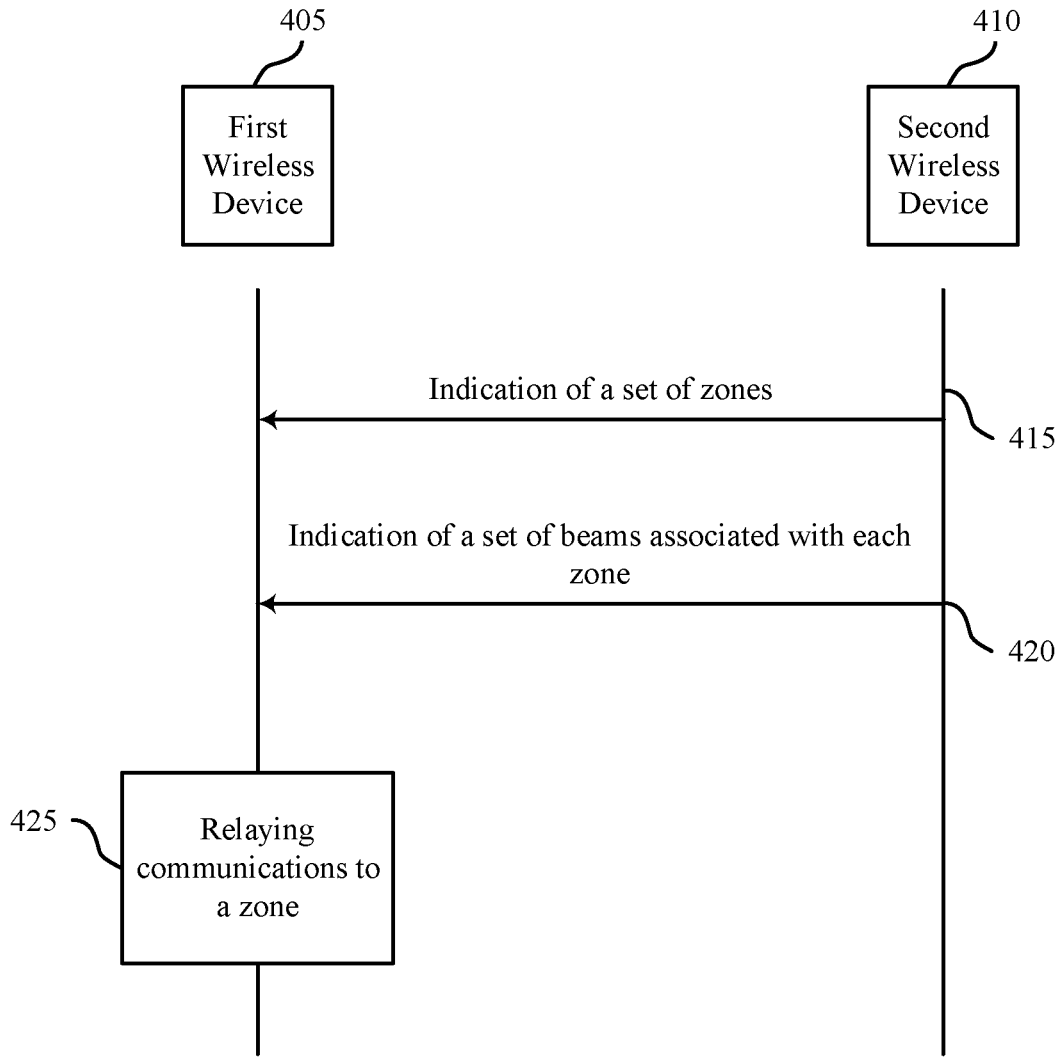
FIG. 4 illustrates an example of a process flow that supports techniques for performing beamforming based on zones in accordance with aspects of the present disclosure.

FIG. 4 illustrates an example of a process flow 400 that supports techniques for performing beamforming based on zones in accordance with aspects of the present disclosure. The process flow 400 may illustrate an example procedure for configuring a device with a set of beams to use for relaying communications to another device or a group of other devices. For example, a first wireless device 405 may be configured with a set of beams by a second wireless device 410. The first wireless device 405 may be a relaying device (e.g., a RIS, a repeater, a low-power UE) and the second wireless device 410 may be a base station or UE, which may be examples of the corresponding wireless devices described with reference to FIGS. 1 through 3. Alternative examples of the following may be implemented, where some steps are performed in a different order than described or are not performed at all. In some cases, steps may include additional features not mentioned below, or further steps may be added.

At 415, the first wireless device 405 may receive a first indication of a set of zones to which the first wireless device 405 is configured to relay one or more messages. Each zone of the set of zones may be associated with a corresponding geographic location.

At 420, the first wireless device 405 may receive a second indication of a set of beams of the first wireless device 405 associated with a corresponding zone of the set of zones, where the set of beams may be configured to serve the corresponding zone.

In some cases, the first wireless device 405 may receive an additional indication that the first wireless device 405 is to serve the corresponding zone. In some cases, the first wireless device 405 may identify that the third wireless device is in the corresponding zone, and select one of the set of beams for the relaying of the communications to the third wireless device based at least in part on the third wireless device being in the corresponding zone. Identifying that the third wireless device is in the corresponding zone may include receiving a zone identifier of the third wireless device, wherein the zone identifier may be associated with the corresponding zone. In some cases, receiving the zone identifier comprises may include receiving the zone identifier in downlink control information that is associated with either triggering or configuring training reference signal occasions to one or more third wireless devices (e.g., UEs) in the corresponding zone. In some cases, receiving the zone identifier may include receiving the zone identifier in downlink control information that is associated with the third wireless device.

In some implementations, the first wireless device 405 may receive an additional indication of respective zones in which one or more reference signals are to be used for beam training, where at least one reference signal of the one or more reference signals may be associated with the corresponding zone, and the first wireless device 405 may select the at least one beam for use in beam training based at least in part on the at least one reference signal being associated with the corresponding zone.

In some cases, the first wireless device 405 may receive, from the second wireless device 410 (e.g., a base station) via a Uu link, a message that includes the first indication, the second indication, or both, where the message may be either a Uu radio resource control message, a Uu medium access control (MAC) control element message, or a Uu downlink control information message. In some cases, the first wireless device 405 may receive, from the second wireless device 410 (e.g., a UE) via a sidelink, a message that includes the first indication, the second indication, or both, where the message may be either a sidelink radio resource control message, a sidelink medium access control (MAC) control element message, a sidelink control information message, or a sidelink shared channel message.

At 425, the first wireless device 405 may relay communications to the corresponding zone using at least one beam of the set of beams based at least in part on the communications being for the corresponding zone or for a third wireless device (e.g., a UE) located in the corresponding zone. The communications relayed to the corresponding zone include at least one of a reference signal, an initial access signal, or a synchronization signal block. Relaying the communications may include identifying one or more spatially correlated beams associated with the at least one beam of the set of beams, and relaying the communications to the third wireless device using the one or more spatially correlated beams and the at least one beam of the set of beams.

In some implementations, the first wireless device 405 may determine an updated set of beams associated with the corresponding zone of the set of zones based at least in part on the relaying of the communications to the corresponding zone. The first wireless device 405 may transmit an additional indication of the updated set of beams to the second wireless device 410 from which the second indication was received.

In some cases, the first wireless device 405 may determine an updated set of beams associated with the third wireless device based at least in part on the relaying of the communications to the third wireless device in the corresponding zone. The first wireless device 405 may transmit an additional indication to the second wireless device 410 from which the second indication was received, wherein the additional indication may associate the updated set of beams with the third wireless device in the corresponding zone.

Figure 5:
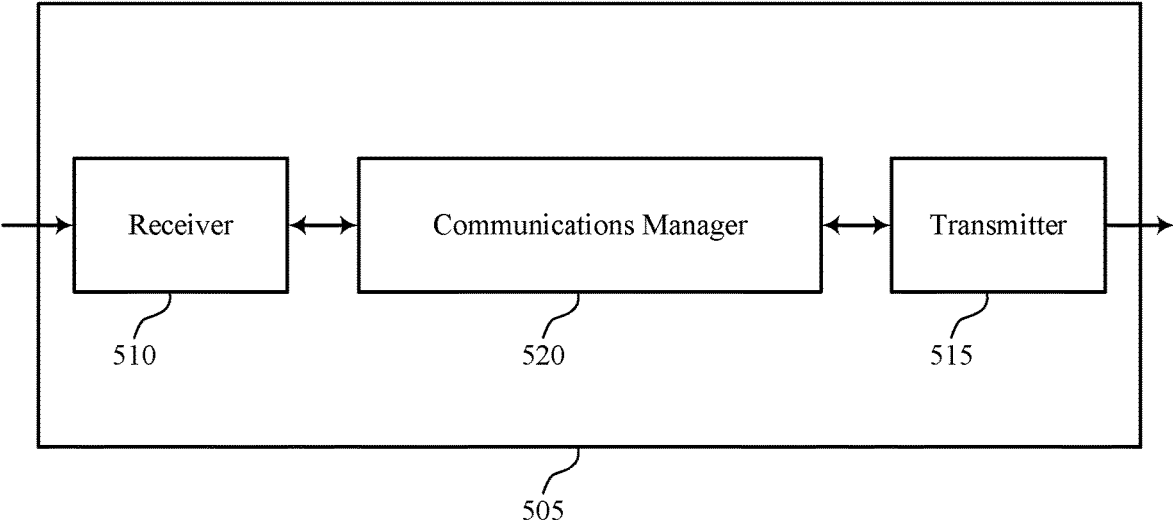
FIGS. 5 and 6 show block diagrams of devices that support techniques for performing beamforming based on zones in accordance with aspects of the present disclosure.

FIG. 5 shows a block diagram 500 of a device 505 that supports techniques for performing beamforming based on zones in accordance with aspects of the present disclosure. The device 505 may be an example of aspects of a network entity, such as a UE, base station, or relaying device, as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for performing beamforming based on zones). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for performing beamforming based on zones). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for performing beamforming based on zones as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first wireless device in accordance with examples as disclosed herein. For example, the communications manager 520 may be configured as or otherwise support a means for receiving a first indication of a set of zones to which the first wireless device is configured to relay one or more messages. The communications manager 520 may be configured as or otherwise support a means for receiving a second indication of a set of beams of the first wireless device associated with a corresponding zone of the set of zones, where the set of beams is configured to serve the corresponding zone. The communications manager 520 may be configured as or otherwise support a means for relaying communications to the corresponding zone using at least one beam of the set of beams based on the communications being for the corresponding zone or for a second wireless device located in the corresponding zone.

Additionally or alternatively, the communications manager 520 may support wireless communications at a first wireless device in accordance with examples as disclosed herein. For example, the communications manager 520 may be configured as or otherwise support a means for transmitting, to a second wireless device, a first indication of a set of zones to which the second wireless device is configured to relay one or more messages from the first wireless device. The communications manager 520 may be configured as or otherwise support a means for transmitting, to the second wireless device, a second indication of a set of beams of the second wireless device associated with a corresponding zone of the set of zones, where the set of beams is configured to serve the corresponding zone.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources.

Figure 6:
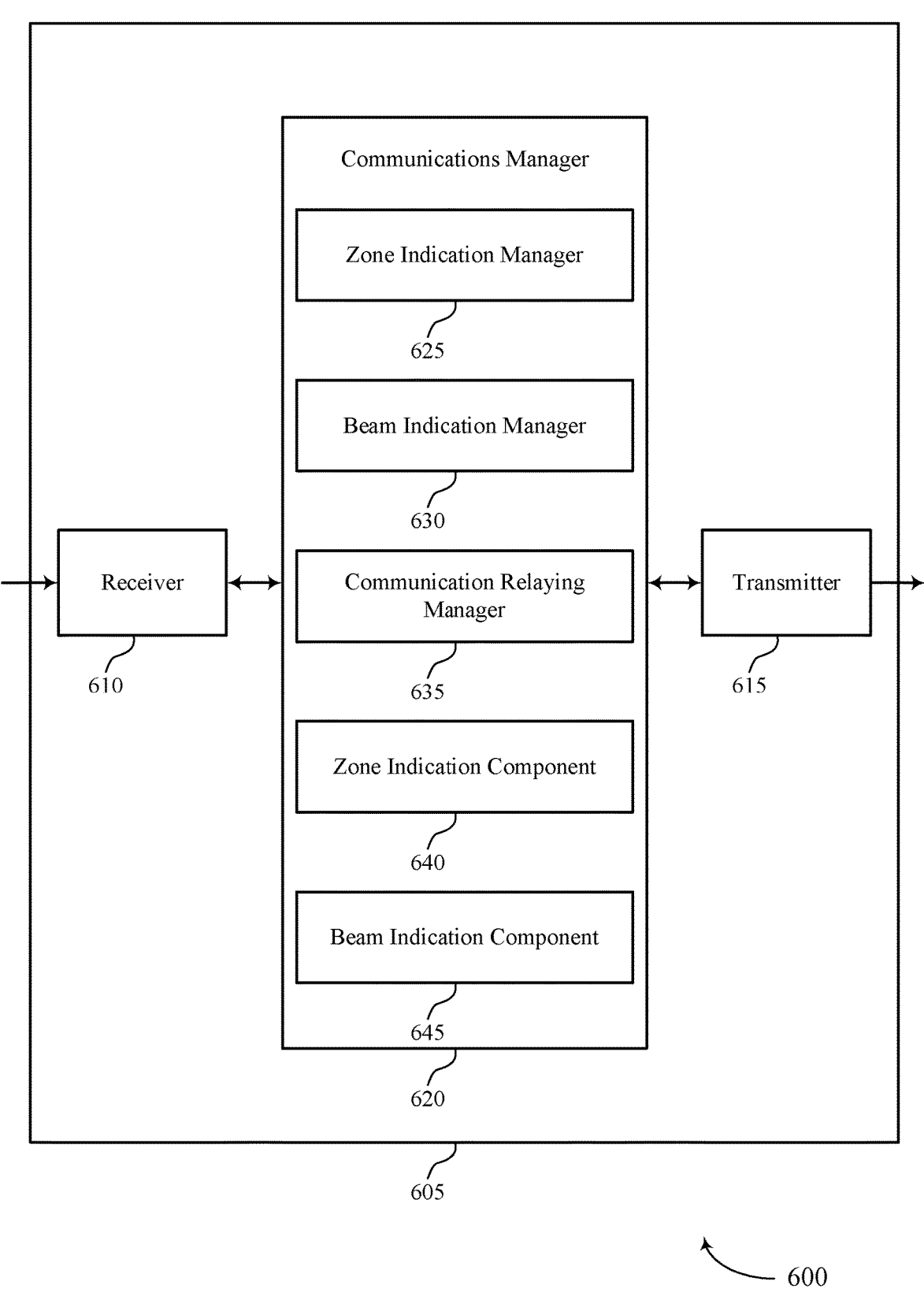

FIG. 6 shows a block diagram 600 of a device 605 that supports techniques for performing beamforming based on zones in accordance with aspects of the present disclosure. The device 605 may be an example of aspects of a device 505 or a network entity, such as a UE, base station, or relaying device, as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for performing beamforming based on zones). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for performing beamforming based on zones). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for performing beamforming based on zones as described herein. For example, the communications manager 620 may include a zone indication manager 625, a beam indication manager 630, a communication relaying manager 635, a zone indication component 640, a beam indication component 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device in accordance with examples as disclosed herein. The zone indication manager 625 may be configured as or otherwise support a means for receiving a first indication of a set of zones to which the first wireless device is configured to relay one or more messages. The beam indication manager 630 may be configured as or otherwise support a means for receiving a second indication of a set of beams of the first wireless device associated with a corresponding zone of the set of zones, where the set of beams is configured to serve the corresponding zone. The communication relaying manager 635 may be configured as or otherwise support a means for relaying communications to the corresponding zone using at least one beam of the set of beams based on the communications being for the corresponding zone or for a second wireless device located in the corresponding zone.

Additionally or alternatively, the communications manager 620 may support wireless communications at a first wireless device in accordance with examples as disclosed herein. The zone indication component 640 may be configured as or otherwise support a means for transmitting, to a second wireless device, a first indication of a set of zones to which the second wireless device is configured to relay one or more messages from the first wireless device. The beam indication component 645 may be configured as or otherwise support a means for transmitting, to the second wireless device, a second indication of a set of beams of the second wireless device associated with a corresponding zone of the set of zones, where the set of beams is configured to serve the corresponding zone.

Figure 7:
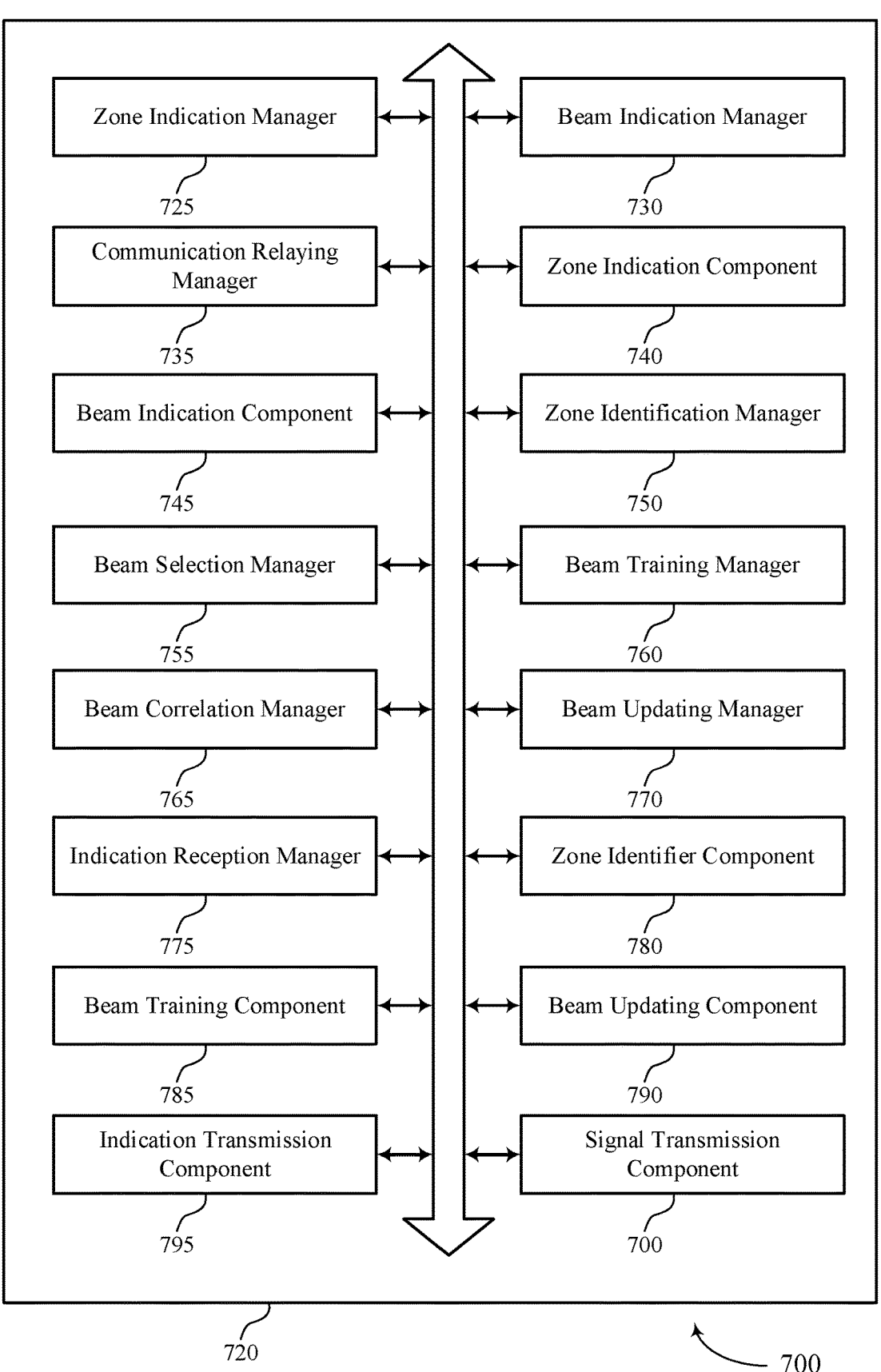
FIG. 7 shows a block diagram of a communications manager that supports techniques for performing beamforming based on zones in accordance with aspects of the present disclosure.

FIG. 7 shows a block diagram 700 of a communications manager 720 that supports techniques for performing beamforming based on zones in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for performing beamforming based on zones as described herein. For example, the communications manager 720 may include a zone indication manager 725, a beam indication manager 730, a communication relaying manager 735, a zone indication component 740, a beam indication component 745, a zone identification manager 750, a beam selection manager 755, a beam training manager 760, a beam correlation manager 765, a beam updating manager 770, an indication reception manager 775, a zone identifier component 780, a beam training component 785, a beam updating component 790, an indication transmission component 795, a signal transmission component 7100, or any combination thereof. Each of these components may communicate, directly or indirectly, with one another (e.g., via one or more buses).

The communications manager 720 may support wireless communications at a first wireless device in accordance with examples as disclosed herein. The zone indication manager 725 may be configured as or otherwise support a means for receiving a first indication of a set of zones to which the first wireless device is configured to relay one or more messages. The beam indication manager 730 may be configured as or otherwise support a means for receiving a second indication of a set of beams of the first wireless device associated with a corresponding zone of the set of zones, where the set of beams is configured to serve the corresponding zone. The communication relaying manager 735 may be configured as or otherwise support a means for relaying communications to the corresponding zone using at least one beam of the set of beams based on the communications being for the corresponding zone or for a second wireless device located in the corresponding zone.

In some examples, the zone indication manager 725 may be configured as or otherwise support a means for receiving an additional indication that the first wireless device is to serve the corresponding zone.

In some examples, the communications relayed to the corresponding zone include at least one of a reference signal, an initial access signal, or a synchronization signal block.

In some examples, the zone identification manager 750 may be configured as or otherwise support a means for identifying that the second wireless device is in the corresponding zone. In some examples, the beam selection manager 755 may be configured as or otherwise support a means for selecting one of the set of beams for the relaying of the communications to the second wireless device based on the second wireless device being in the corresponding zone.

In some examples, to support identifying that the second wireless device is in the corresponding zone, the zone identification manager 750 may be configured as or otherwise support a means for receiving a zone identifier of the second wireless device, where the zone identifier is associated with the corresponding zone.

In some examples, to support receiving the zone identifier, the zone identification manager 750 may be configured as or otherwise support a means for receiving the zone identifier in downlink control information that is associated with either triggering or configuring training reference signal occasions to one or more UEs in the corresponding zone.

In some examples, to support receiving the zone identifier, the zone identification manager 750 may be configured as or otherwise support a means for receiving the zone identifier in downlink control information that is associated with the second wireless device.

In some examples, the beam training manager 760 may be configured as or otherwise support a means for receiving an additional indication of respective zones in which one or more reference signals are to be used for beam training, at least one reference signal of the one or more reference signals associated with the corresponding zone. In some examples, the beam training manager 760 may be configured as or otherwise support a means for selecting the at least one beam for use in beam training based on the at least one reference signal being associated with the corresponding zone.

In some examples, to support relaying the communications, the beam correlation manager 765 may be configured as or otherwise support a means for identifying one or more spatially correlated beams associated with the at least one beam of the set of beams. In some examples, to support relaying the communications, the communication relaying manager 735 may be configured as or otherwise support a means for relaying the communications to the second wireless device using the one or more spatially correlated beams and the at least one beam of the set of beams.

In some examples, the beam updating manager 770 may be configured as or otherwise support a means for determining an updated set of beams associated with the corresponding zone of the set of zones based on the relaying of the communications to the corresponding zone.

In some examples, the beam updating manager 770 may be configured as or otherwise support a means for transmitting an additional indication of the updated set of beams to a third wireless device from which the second indication was received.

In some examples, the beam updating manager 770 may be configured as or otherwise support a means for determining an updated set of beams associated with the second wireless device based on the relaying of the communications to the second wireless device in the corresponding zone.

In some examples, the beam updating manager 770 may be configured as or otherwise support a means for transmitting an additional indication to a third wireless device from which the second indication was received, where the additional indication associates the updated set of beams with the second wireless device in the corresponding zone.

In some examples, the indication reception manager 775 may be configured as or otherwise support a means for receiving, from a base station via a Uu link, a message that includes the first indication, the second indication, or both, the message being either a Uu radio resource control message, a Uu medium access control (MAC) control element message, or a Uu downlink control information message.

In some examples, the indication reception manager 775 may be configured as or otherwise support a means for receiving, from a UE via a sidelink, a message that includes the first indication, the second indication, or both, the message being either a sidelink radio resource control message, a sidelink medium access control (MAC) control element message, a sidelink control information message, or a sidelink shared channel message.

In some examples, the first wireless device is a reconfigurable reflective surface, a low-power UE, or a repeater device.

In some examples, each zone of the set of zones is associated with a corresponding geographic location.

Additionally or alternatively, the communications manager 720 may support wireless communications at a first wireless device in accordance with examples as disclosed herein. The zone indication component 740 may be configured as or otherwise support a means for transmitting, to a second wireless device, a first indication of a set of zones to which the second wireless device is configured to relay one or more messages from the first wireless device. The beam indication component 745 may be configured as or otherwise support a means for transmitting, to the second wireless device, a second indication of a set of beams of the second wireless device associated with a corresponding zone of the set of zones, where the set of beams is configured to serve the corresponding zone.

In some examples, the zone indication component 740 may be configured as or otherwise support a means for transmitting an additional indication that the second wireless device is to serve the corresponding zone.

In some examples, the signal transmission component 7100 may be configured as or otherwise support a means for transmitting, for relay by the second wireless device to the corresponding zone, at least one of a reference signal, an initial access signal, or a synchronization signal block.

In some examples, the zone identifier component 780 may be configured as or otherwise support a means for transmitting a zone identifier of a third wireless device to which the second wireless device is to relay communications from the first wireless device, where the zone identifier is associated with the corresponding zone.

In some examples, to support transmitting the zone identifier, the zone identifier component 780 may be configured as or otherwise support a means for transmitting the zone identifier in downlink control information that is associated with either triggering or configuring training reference signal occasions to one or more UEs in the corresponding zone.

In some examples, to support transmitting the zone identifier, the zone identifier component 780 may be configured as or otherwise support a means for transmitting the zone identifier in downlink control information that is associated with the third wireless device.

In some examples, the beam training component 785 may be configured as or otherwise support a means for transmitting an additional indication of respective zones in which one or more reference signals are to be used for beam training, at least one reference signal of the one or more reference signals associated with the corresponding zone.

In some examples, the beam updating component 790 may be configured as or otherwise support a means for receiving an additional indication of an updated set of beams from the second wireless device, where the updated set of beams is associated with the corresponding zone of the set of zones based on relaying by the second wireless device of communications from the first wireless device to the corresponding zone.

In some examples, the beam updating component 790 may be configured as or otherwise support a means for receiving an additional indication of an updated set of beams from the second wireless device, where the additional indication associates the updated set of beams with a third wireless device in the corresponding zone, where the updated set of beams is associated with the third wireless device based on relaying by the second wireless device of communications from the first wireless device to the third wireless device in the corresponding zone.

In some examples, the indication transmission component 795 may be configured as or otherwise support a means for transmitting, via a Uu link, a message that includes the first indication, the second indication, or both, the message being either a Uu radio resource control message, a Uu medium access control (MAC) control element message, or a Uu downlink control information message, where the first wireless device is a base station.

In some examples, the indication transmission component 795 may be configured as or otherwise support a means for transmitting, via a sidelink, a message that includes the first indication, the second indication, or both, the message being either a sidelink radio resource control message, a sidelink medium access control (MAC) control element message, a sidelink control information message, or a sidelink shared channel message, where the first wireless device is a UE.

Figure 8:
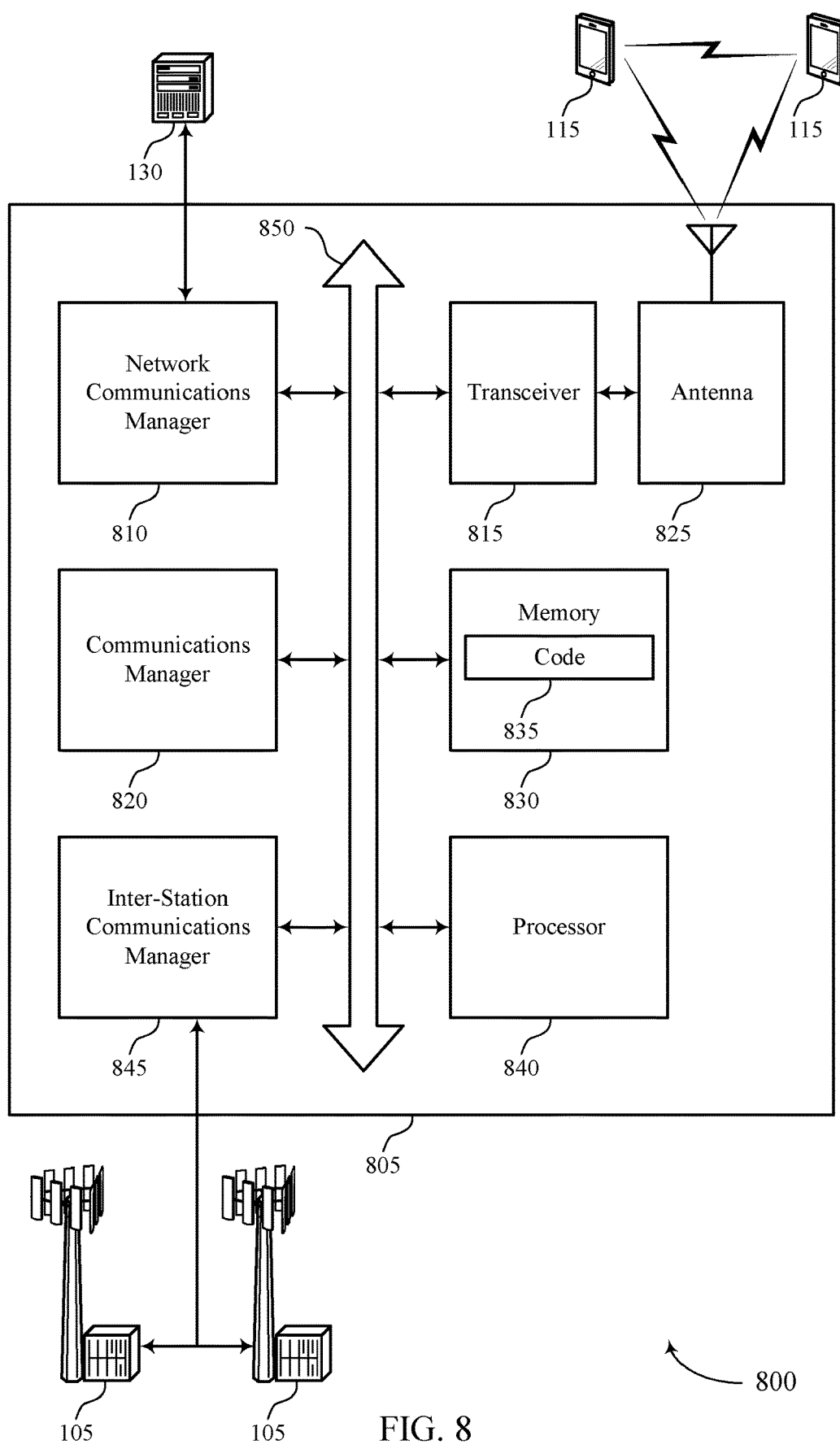
FIG. 8 shows a diagram of a system including a device that supports techniques for performing beamforming based on zones in accordance with aspects of the present disclosure.

FIG. 8 shows a diagram of a system 800 including a device 805 that supports techniques for performing beamforming based on zones in accordance with aspects of the present disclosure. The device 805 may be an example of or include the components of a device 505, a device 605, or a network entity, such as a UE, base station, or relaying device, as described herein. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for performing beamforming based on zones). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communications at a first wireless device in accordance with examples as disclosed herein. For example, the communications manager 820 may be configured as or otherwise support a means for receiving a first indication of a set of zones to which the first wireless device is configured to relay one or more messages. The communications manager 820 may be configured as or otherwise support a means for receiving a second indication of a set of beams of the first wireless device associated with a corresponding zone of the set of zones, where the set of beams is configured to serve the corresponding zone. The communications manager 820 may be configured as or otherwise support a means for relaying communications to the corresponding zone using at least one beam of the set of beams based on the communications being for the corresponding zone or for a second wireless device located in the corresponding zone.

Additionally or alternatively, the communications manager 820 may support wireless communications at a first wireless device in accordance with examples as disclosed herein. For example, the communications manager 820 may be configured as or otherwise support a means for transmitting, to a second wireless device, a first indication of a set of zones to which the second wireless device is configured to relay one or more messages from the first wireless device. The communications manager 820 may be configured as or otherwise support a means for transmitting, to the second wireless device, a second indication of a set of beams of the second wireless device associated with a corresponding zone of the set of zones, where the set of beams is configured to serve the corresponding zone.

By including or configuring the communications manager 820 in accordance with examples as described herein, the device 805 may support techniques for more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for performing beamforming based on zones as described herein, or the processor 840 and the memory 830 may be otherwise configured to perform or support such operations.

FIG. 9 shows a flowchart illustrating a method 900 that supports techniques for performing beamforming based on zones in accordance with aspects of the present disclosure. The operations of the method 900 may be implemented by a network entity, such as a UE, base station, or relaying device, or its components as described herein. For example, the operations of the method 900 may be performed by a network entity, such as a UE, base station, or relaying device, as described with reference to FIGS. 1 through 8. In some examples, a network entity may execute a set of instructions to control the functional elements of the network entity to perform the described functions. Additionally or alternatively, the network entity may perform aspects of the described functions using special-purpose hardware.

At 905, the method may include receiving a first indication of a set of zones to which the first wireless device is configured to relay one or more messages. The operations of

905 may be performed in accordance with examples as disclosed herein. In some examples, aspects of the operations of 905 may be performed by a zone indication manager 725 as described with reference to FIG. 7.

At 910, the method may include receiving a second indication of a set of beams of the first wireless device associated with a corresponding zone of the set of zones, where the set of beams is configured to serve the corresponding zone. The operations of 910 may be performed in accordance with examples as disclosed herein. In some examples, aspects of the operations of 910 may be performed by a beam indication manager 730 as described with reference to FIG. 7.

At 915, the method may include relaying communications to the corresponding zone using at least one beam of the set of beams based on the communications being for the corresponding zone or for a second wireless device located in the corresponding zone. The operations of 915 may be performed in accordance with examples as disclosed herein. In some examples, aspects of the operations of 915 may be performed by a communication relaying manager 735 as described with reference to FIG. 7.

FIG. 10 shows a flowchart illustrating a method 1000 that supports techniques for performing beamforming based on zones in accordance with aspects of the present disclosure. The operations of the method 1000 may be implemented by a network entity, such as a UE, base station, or relaying device, or its components as described herein. For example, the operations of the method 1000 may be performed by a network entity, such as a UE, base station, or relaying device, as described with reference to FIGS. 1 through 8. In some examples, a network entity may execute a set of instructions to control the functional elements of the network entity to perform the described functions. Additionally or alternatively, the network entity may perform aspects of the described functions using special-purpose hardware.

At 1005, the method may include receiving a first indication of a set of zones to which the first wireless device is configured to relay one or more messages. The operations of 1005 may be performed in accordance with examples as disclosed herein. In some examples, aspects of the operations of 1005 may be performed by a zone indication manager 725 as described with reference to FIG. 7.

At 1010, the method may include receiving a second indication of a set of beams of the first wireless device associated with a corresponding zone of the set of zones, where the set of beams is configured to serve the corresponding zone. The operations of 1010 may be performed in accordance with examples as disclosed herein. In some examples, aspects of the operations of 1010 may be performed by a beam indication manager 730 as described with reference to FIG. 7.

At 1015, the method may include receiving an additional indication that the first wireless device is to serve the corresponding zone. The operations of 1015 may be performed in accordance with examples as disclosed herein. In some examples, aspects of the operations of 1015 may be performed by a zone indication manager 725 as described with reference to FIG. 7.

At 1020, the method may include relaying communications to the corresponding zone using at least one beam of the set of beams based on the communications being for the corresponding zone or for a second wireless device located in the corresponding zone. The operations of 1020 may be performed in accordance with examples as disclosed herein. In some examples, aspects of the operations of 1020 may be performed by a communication relaying manager 735 as described with reference to FIG. 7.

FIG. 11 shows a flowchart illustrating a method 1100 that supports techniques for performing beamforming based on zones in accordance with aspects of the present disclosure. The operations of the method 1100 may be implemented by a network entity, such as a UE, base station, or relaying device, or its components as described herein. For example, the operations of the method 1100 may be performed by a network entity, such as a UE, base station, or relaying device, as described with reference to FIGS. 1 through 8. In some examples, a network entity may execute a set of instructions to control the functional elements of the network entity to perform the described functions. Additionally or alternatively, the network entity may perform aspects of the described functions using special-purpose hardware.

At 1105, the method may include receiving a first indication of a set of zones to which the first wireless device is configured to relay one or more messages. The operations of 1105 may be performed in accordance with examples as disclosed herein. In some examples, aspects of the operations of 1105 may be performed by a zone indication manager 725 as described with reference to FIG. 7.

At 1110, the method may include receiving a second indication of a set of beams of the first wireless device associated with a corresponding zone of the set of zones, where the set of beams is configured to serve the corresponding zone. The operations of 1110 may be performed in accordance with examples as disclosed herein. In some examples, aspects of the operations of 1110 may be performed by a beam indication manager 730 as described with reference to FIG. 7.

At 1115, the method may include relaying communications to the corresponding zone using at least one beam of the set of beams based on the communications being for the corresponding zone or for a second wireless device located in the corresponding zone. The operations of 1115 may be performed in accordance with examples as disclosed herein. In some examples, aspects of the operations of 1115 may be performed by a communication relaying manager 735 as described with reference to FIG. 7.

At 1120, the method may include determining an updated set of beams associated with the corresponding zone of the set of zones based on the relaying of the communications to the corresponding zone. The operations of 1120 may be performed in accordance with examples as disclosed herein. In some examples, aspects of the operations of 1120 may be performed by a beam updating manager 770 as described with reference to FIG. 7.

FIG. 12 shows a flowchart illustrating a method 1200 that supports techniques for performing beamforming based on zones in accordance with aspects of the present disclosure. The operations of the method 1200 may be implemented by a network entity, such as a UE, base station, or relaying device, or its components as described herein. For example, the operations of the method 1200 may be performed by a network entity, such as a UE, base station, or relaying device, as described with reference to FIGS. 1 through 8. In some examples, a network entity may execute a set of instructions to control the functional elements of the network entity to perform the described functions. Additionally or alternatively, the network entity may perform aspects of the described functions using special-purpose hardware.

At 1205, the method may include transmitting, to a second wireless device, a first indication of a set of zones to which the second wireless device is configured to relay one or more messages from the first wireless device. The operations of 1205 may be performed in accordance with examples as disclosed herein. In some examples, aspects of the operations of 1205 may be performed by a zone indication component 740 as described with reference to FIG. 7.

At 1210, the method may include transmitting, to the second wireless device, a second indication of a set of beams of the second wireless device associated with a corresponding zone of the set of zones, where the set of beams is configured to serve the corresponding zone. The operations of 1210 may be performed in accordance with examples as disclosed herein. In some examples, aspects of the operations of 1210 may be performed by a beam indication component 745 as described with reference to FIG. 7.

The following provides an overview of aspects of the present disclosure:

Aspect 1: A method for wireless communications at a first wireless device, comprising: receiving a first indication of a set of zones to which the first wireless device is configured to relay one or more messages; receiving a second indication of a set of beams of the first wireless device associated with a corresponding zone of the set of zones, wherein the set of beams is configured to serve the corresponding zone; and relaying communications to the corresponding zone using at least one beam of the set of beams based at least in part on the communications being for the corresponding zone or for a second wireless device located in the corresponding zone.

Aspect 2: The method of aspect 1, further comprising: receiving an additional indication that the first wireless device is to serve the corresponding zone.

Aspect 3: The method of any of aspects 1 through 2, wherein the communications relayed to the corresponding zone include at least one of a reference signal, an initial access signal, or a synchronization signal block.

Aspect 4: The method of any of aspects 1 through 3, further comprising: identifying that the second wireless device is in the corresponding zone; and selecting one of the set of beams for the relaying of the communications to the second wireless device based at least in part on the second wireless device being in the corresponding zone.

Aspect 5: The method of aspect 4, wherein identifying that the second wireless device is in the corresponding zone comprises: receiving a zone identifier of the second wireless device, wherein the zone identifier is associated with the corresponding zone.

Aspect 6: The method of aspect 5, wherein receiving the zone identifier comprises: receiving the zone identifier in downlink control information that is associated with either triggering or configuring training reference signal occasions to one or more UEs in the corresponding zone.

Aspect 7: The method of any of aspects 5 through 6, wherein receiving the zone identifier comprises: receiving the zone identifier in downlink control information that is associated with the second wireless device.

Aspect 8: The method of any of aspects 1 through 7, further comprising: receiving an additional indication of respective zones in which one or more reference signals are to be used for beam training, at least one reference signal of the one or more reference signals associated with the corresponding zone; and selecting the at least one beam for use in beam training based at least in part on the at least one reference signal being associated with the corresponding zone.

Aspect 9: The method of any of aspects 1 through 8, wherein relaying the communications further comprises: identifying one or more spatially correlated beams associated with the at least one beam of the set of beams; and relaying the communications to the second wireless device using the one or more spatially correlated beams and the at least one beam of the set of beams.

Aspect 10: The method of any of aspects 1 through 9, further comprising: determining an updated set of beams associated with the corresponding zone of the set of zones based at least in part on the relaying of the communications to the corresponding zone.

Aspect 11: The method of aspect 10, further comprising: transmitting an additional indication of the updated set of beams to a third wireless device from which the second indication was received.

Aspect 12: The method of any of aspects 1 through 11, further comprising: determining an updated set of beams associated with the second wireless device based at least in part on the relaying of the communications to the second wireless device in the corresponding zone.

Aspect 13: The method of aspect 12, further comprising: transmitting an additional indication to a third wireless device from which the second indication was received, wherein the additional indication associates the updated set of beams with the second wireless device in the corresponding zone.

Aspect 14: The method of any of aspects 1 through 13, further comprising: receiving, from a base station via a Uu link, a message that includes the first indication, the second indication, or both, the message being either a Uu radio resource control message, a Uu medium access control (MAC) control element message, or a Uu downlink control information message.

Aspect 15: The method of any of aspects 1 through 14, further comprising: receiving, from a UE via a sidelink, a message that includes the first indication, the second indication, or both, the message being either a sidelink radio resource control message, a sidelink medium access control (MAC) control element message, a sidelink control information message, or a sidelink shared channel message.

Aspect 16: The method of any of aspects 1 through 15, wherein the first wireless device is a reconfigurable reflective surface, a low-power user equipment, or a repeater device.

Aspect 17: The method of any of aspects 1 through 16, wherein each zone of the set of zones is associated with a corresponding geographic location.

Aspect 18: A method for wireless communications at a first wireless device, comprising: transmitting, to a second wireless device, a first indication of a set of zones to which the second wireless device is configured to relay one or more messages from the first wireless device; and transmitting, to the second wireless device, a second indication of a set of beams of the second wireless device associated with a corresponding zone of the set of zones, wherein the set of beams is configured to serve the corresponding zone.

Aspect 19: The method of aspect 18, further comprising: transmitting an additional indication that the second wireless device is to serve the corresponding zone.

Aspect 20: The method of aspect 19, further comprising: transmitting, for relay by the second wireless device to the corresponding zone, at least one of a reference signal, an initial access signal, or a synchronization signal block.

Aspect 21: The method of any of aspects 18 through 20, further comprising: transmitting a zone identifier of a third wireless device to which the second wireless device is to relay communications from the first wireless device, wherein the zone identifier is associated with the corresponding zone.

Aspect 22: The method of aspect 21, wherein transmitting the zone identifier comprises: transmitting the zone identifier in downlink control information that is associated with either triggering or configuring training reference signal occasions to one or more UEs in the corresponding zone.

Aspect 23: The method of any of aspects 21 through 22, wherein transmitting the zone identifier comprises: transmitting the zone identifier in downlink control information that is associated with the third wireless device.

Aspect 24: The method of any of aspects 18 through 23, further comprising: transmitting an additional indication of respective zones in which one or more reference signals are to be used for beam training, at least one reference signal of the one or more reference signals associated with the corresponding zone.

Aspect 25: The method of any of aspects 18 through 24, further comprising: receiving an additional indication of an updated set of beams from the second wireless device, wherein the updated set of beams is associated with the corresponding zone of the set of zones based at least in part on relaying by the second wireless device of communications from the first wireless device to the corresponding zone.

Aspect 26: The method of any of aspects 18 through 25, further comprising: receiving an additional indication of an updated set of beams from the second wireless device, wherein the additional indication associates the updated set of beams with a third wireless device in the corresponding zone, wherein the updated set of beams is associated with the third wireless device based at least in part on relaying by the second wireless device of communications from the first wireless device to the third wireless device in the corresponding zone.

Aspect 27: The method of any of aspects 18 through 26, further comprising: transmitting, via a Uu link, a message that includes the first indication, the second indication, or both, the message being either a Uu radio resource control message, a Uu medium access control (MAC) control element message, or a Uu downlink control information message, wherein the first wireless device is a base station.

Aspect 28: The method of any of aspects 18 through 27, further comprising: transmitting, via a sidelink, a message that includes the first indication, the second indication, or both, the message being either a sidelink radio resource control message, a sidelink medium access control (MAC) control element message, a sidelink control information message, or a sidelink shared channel message, wherein the first wireless device is a UE.

Aspect 29: An apparatus for wireless communications, comprising a processor; memory coupled with the processor; and instructions stored in the memory and executable by the processor to cause the apparatus to perform a method of any of aspects 1 through 17.

Aspect 30: An apparatus for wireless communications, comprising at least one means for performing a method of any of aspects 1 through 17.

Aspect 31: A non-transitory computer-readable medium storing code for wireless communications, the code comprising instructions executable by a processor to perform a method of any of aspects 1 through 17.

Aspect 32: An apparatus for wireless communications, comprising a processor; memory coupled with the processor; and instructions stored in the memory and executable by the processor to cause the apparatus to perform a method of any of aspects 18 through 28.

Aspect 33: An apparatus for wireless communications, comprising at least one means for performing a method of any of aspects 18 through 28.

Aspect 34: A non-transitory computer-readable medium storing code for wireless communications, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
receiving a first indication of a set of zones to which the first wireless device is configured to relay one or more messages;
receiving a second indication of a set of beams of the first wireless device associated with a corresponding zone of the set of zones, wherein the set of beams is configured to serve the corresponding zone;
relaying communications to the corresponding zone using at least one beam of the set of beams based at least in part on the communications being for the corresponding zone or for a second wireless device located in the corresponding zone; and
determining an updated set of beams associated with the corresponding zone of the set of zones based at least in part on the relaying of the communications to the corresponding zone.

2. The method of claim 1, further comprising:
identifying that the second wireless device is in the corresponding zone; and
selecting one of the set of beams for the relaying of the communications to the second wireless device based at least in part on the second wireless device being in the corresponding zone.

3. The method of claim 2, wherein identifying that the second wireless device is in the corresponding zone comprises:
receiving a zone identifier of the second wireless device, wherein the zone identifier is associated with the corresponding zone.

4. The method of claim 3, wherein receiving the zone identifier comprises:
receiving the zone identifier in downlink control information that is associated with either triggering or configuring training reference signal occasions to one or more UEs in the corresponding zone.

5. The method of claim 3, wherein receiving the zone identifier comprises:
receiving the zone identifier in downlink control information that is associated with the second wireless device.

6. The method of claim 1, further comprising:
receiving an additional indication of respective zones in which one or more reference signals are to be used for beam training, at least one reference signal of the one or more reference signals associated with the corresponding zone; and
selecting the at least one beam for use in beam training based at least in part on the at least one reference signal being associated with the corresponding zone.

7. The method of claim 1, further comprising:
transmitting an additional indication of the updated set of beams to a third wireless device from which the second indication was received.

8. The method of claim 1, further comprising:
determining an updated set of beams associated with the second wireless device based at least in part on the relaying of the communications to the second wireless device in the corresponding zone.

9. The method of claim 8, further comprising:

transmitting an additional indication to a third wireless device from which the second indication was received, wherein the additional indication associates the updated set of beams with the second wireless device in the corresponding zone.

10. The method of claim 1, further comprising:

receiving, from a base station via a Uu link, a message that includes the first indication, the second indication, or both, the message being either a Uu radio resource control message, a Uu medium access control (MAC) control element message, or a Uu downlink control information message.

11. The method of claim 1, further comprising:

receiving, from a user equipment (UE) via a sidelink, a message that includes the first indication, the second indication, or both, the message being either a sidelink radio resource control message, a sidelink medium access control (MAC) control element message, a sidelink control information message, or a sidelink shared channel message.

12. The method of claim 1, wherein the first wireless device is a reconfigurable reflective surface, a low-power user equipment, or a repeater device.

13. The method of claim 1, wherein each zone of the set of zones is associated with a corresponding geographic location.

14. A method for wireless communications at a first wireless device, comprising:

transmitting, to a second wireless device, a first indication of a set of zones to which the second wireless device is configured to relay one or more messages from the first wireless device;

transmitting, to the second wireless device, a second indication of a set of beams of the second wireless device associated with a corresponding zone of the set of zones, wherein the set of beams is configured to serve the corresponding zone; and receiving an additional indication of an updated set of beams from the second wireless device, wherein the updated set of beams is associated with the corresponding zone of the set of zones based at least in part on relaying by the second wireless device of communications from the first wireless device to the corresponding zone.

15. The method of claim 14, further comprising:

transmitting a zone identifier of a third wireless device to which the second wireless device is to relay communications from the first wireless device, wherein the zone identifier is associated with the corresponding zone.

16. The method of claim 15, wherein transmitting the zone identifier comprises:

transmitting the zone identifier in downlink control information that is associated with either triggering or configuring training reference signal occasions to one or more UEs in the corresponding zone.

17. The method of claim 15, wherein transmitting the zone identifier comprises:

transmitting the zone identifier in downlink control information that is associated with the third wireless device.

18. The method of claim 14, further comprising:

receiving an additional indication of an updated set of beams from the second wireless device, wherein the additional indication associates the updated set of beams with a third wireless device in the corresponding zone, wherein the updated set of beams is associated with the third wireless device based at least in part on relaying by the second wireless device of communications from the first wireless device to the third wireless device in the corresponding zone.

19. The method of claim 14, further comprising:

transmitting, via a Uu link, a message that includes the first indication, the second indication, or both, the message being either a Uu radio resource control message, a Uu medium access control (MAC) control element message, or a Uu downlink control information message, wherein the first wireless device is a base station.

20. The method of claim 14, further comprising:

transmitting, via a sidelink, a message that includes the first indication, the second indication, or both, the message being either a sidelink radio resource control message, a sidelink medium access control (MAC) control element message, a sidelink control information message, or a sidelink shared channel message, wherein the first wireless device is a user equipment (UE).

21. An apparatus for wireless communications, comprising:

a processor;

memory coupled with the processor; and instructions stored in the memory and executable by the processor to cause the apparatus to:

receive a first indication of a set of zones to which a first wireless device is configured to relay one or more messages;

receive a second indication of a set of beams of the first wireless device associated with a corresponding zone of the set of zones, wherein the set of beams is configured to serve the corresponding zone;

relay communications to the corresponding zone using at least one beam of the set of beams based at least in part on the communications being for the corresponding zone or for a second wireless device located in the corresponding zone;

identify one or more spatially correlated beams associated with the at least one beam of the set of beams; and relay the communications to the second wireless device using the one or more spatially correlated beams and the at least one beam of the set of beams.

22. The apparatus of claim 21, wherein the instructions are further executable by the processor to cause the apparatus to:

receive an additional indication that the first wireless device is to serve the corresponding zone.

23. The apparatus of claim 21, wherein the communications relayed to the corresponding zone include at least one of a reference signal, an initial access signal, or a synchronization signal block.

24. An apparatus for wireless communications, comprising:

a processor;

memory coupled with the processor; and instructions stored in the memory and executable by the processor to cause the apparatus to:

transmit, to a second wireless device, a first indication of a set of zones to which the second wireless device is configured to relay one or more messages from a first wireless device;

transmit, to the second wireless device, a second indication of a set of beams of the second wireless device associated with a corresponding zone of the set of zones, wherein the set of beams is configured to serve the corresponding zone; and transmit an additional indication of respective zones in which one or more reference signals are to be used for beam training, at least one reference signal of the one or more reference signals associated with the corresponding zone.

25. The apparatus of claim 24, wherein the instructions are further executable by the processor to cause the apparatus to:

transmit an additional indication that the second wireless device is to serve the corresponding zone.

26. The apparatus of claim 25, wherein the instructions are further executable by the processor to cause the apparatus to:

transmit, for relay by the second wireless device to the corresponding zone, at least one of a reference signal, an initial access signal, or a synchronization signal block.

* * * * *